(12) United States Patent
Miyajima et al.

(10) Patent No.: US 6,812,912 B2
(45) Date of Patent: Nov. 2, 2004

(54) ACTIVE MATRIX DISPLAY DEVICE WITH STORAGE CAPACITOR FOR EACH PIXEL

(75) Inventors: Yasushi Miyajima, Gifu (JP); Ryoichi Yokoyama, Ogaki (JP); Tsutomu Yamada, Gifu (JP); Kiyoshi Yoneda, Gifu (JP)

(73) Assignee: Sanyo Electric Co., Ltd. (JP)

( * ) Notice: Subject to any disclaimer, the term of this patent is extended or adjusted under 35 U.S.C. 154(b) by 398 days.

(21) Appl. No.: 10/113,693

(22) Filed: Mar. 28, 2002

(65) Prior Publication Data

US 2002/0171086 A1 Nov. 21, 2002

(30) Foreign Application Priority Data

| Mar. 30, 2001 | (JP) | ......................................... 2001-098269 |
| Mar. 30, 2001 | (JP) | ......................................... 2001-098281 |
| Mar. 30, 2001 | (JP) | ......................................... 2001-098323 |
| Mar. 30, 2001 | (JP) | ......................................... 2001-098334 |

(51) Int. Cl.$^7$ ................................................. G09G 3/36
(52) U.S. Cl. ............................. 345/92; 349/42; 349/43; 257/59
(58) Field of Search ............................. 345/87, 90, 92, 345/205; 349/84, 41, 42, 43, 44; 257/59, 72, 296, 327

(56) References Cited

U.S. PATENT DOCUMENTS 5,986,723 A    11/1999   Nakamura et al.
6,057,904 A  * 5/2000   Kim et al. ................... 349/143
6,133,968 A  * 10/2000  Asada .......................... 349/43
6,346,730 B1 * 2/2002   Kitakado et al. ........... 257/350
6,362,507 B1 * 3/2002   Ogawa et al. .............. 257/350
6,559,920 B1 * 5/2003   Ahn et al. ................... 349/187
6,563,136 B2 * 5/2003   Kunii ........................... 257/72
6,753,656 B2 * 6/2004   Kimura .................... 315/169.3

FOREIGN PATENT DOCUMENTS

EP           1245996         * 10/2002

* cited by examiner

*Primary Examiner*—Kent Chang
(74) *Attorney, Agent, or Firm*—Cantor Colburn LLP

(57) ABSTRACT

An active matrix display device employing a top gate type TFT structure has a storage capacitor Csc and a liquid crystal capacitor Clc in each pixel of a pixel section, a first electrode of the storage capacitor Csc served by a p-Si active layer of the TFT, and a second electrode formed to at least partly overlap the active layer, with an insulating layer between the active layer and the second electrode below it. When a driver section is to be built in, the driver section TFT is the same top gate type as the pixel section TFT, and an active layer is made of the same material as the active layer and has a conductive layer which is made of the same material as the second electrode with the insulating layer held between the active layer and the conductive layer below it. The pixel section can form the storage capacitor while preventing lowering of the aperture ratio. Because conditions for the polycrystalization annealing of the active layer are equal for the pixel section TFT and the driver section TFT, TFTs with the same properties can be obtained.

27 Claims, 17 Drawing Sheets

ACTIVE MATRIX DISPLAY DEVICE WITH STORAGE CAPACITOR FOR EACH PIXEL

BACKGROUND OF THE INVENTION

1. Field of the Invention

The present invention relates to an active matrix display device having a thin-film transistor disposed for each pixel.

2. Description of the Related Art

A flat panel display such as a liquid crystal display device (hereinafter referred as an "LCD") can be made thin, compact, and lightweight, and has low power consumption. Liquid crystal displays are now used as display devices in various types of electronic equipment such as portable information equipment. LCDs which have a thin-film transistor disposed as a switch element for each pixel are referred to as active matrix type LCDs, and such panels are used as high resolution, high display quality display devices because they can reliably maintain the display content of each pixel.

FIG. 1 shows an equivalent circuit of a pixel of an active matrix LCD. Each pixel is provided with a thin-film transistor (TFT) 1 which is connected to a gate line and a data line and, when the TFT is turned on by a selection signal output to the gate line, data corresponding to the display content is supplied from the data line to a liquid crystal capacitor 2 (Clc) through the TFT. Here, a storage capacitor 3 (Csc) is connected to the TFT in parallel to the liquid crystal capacitor Clc because it is necessary to securely maintain the written display data for a period during which the TFT is selected, data is written and the next TFT is selected.

FIG. 2 shows a plane structure of a pixel section of the TFT formed substrate (a first substrate 100) of a conventional LCD, and FIG. 3 shows a sectional structure of the LCD taken along line X—X of FIG. 2. The LCD has a structure in which liquid crystal is sealed between first and second substrates. In this active matrix LCD, TFTs 1, pixel electrodes 74, etc. are arranged in a matrix on the first substrate 100, and a common electrode 56 to which a common voltage Vcom is applied, a color filter 54 and the like are formed on the second substrate disposed to face the first substrate. The liquid crystal capacitor Clc is driven for each pixel by a voltage applied between the respective pixel electrodes 74 and the opposing common electrode 56, with liquid crystal 200 between them.

The TFTs disposed for each pixel on the side of the first electrode 100 are so-called top gate TFTs which have a gate electrode 60 disposed on a layer above an active layer 64, as shown in FIG. 3. The active layer 64 of the TFT is patterned on a substrate 5 as shown in FIG. 2, a gate insulating film 66 is formed to cover the active layer 64, and the gate line, which also serves as the gate electrode 60, is formed on the gate insulating film 66. The active layer 64 has a channel region 64c positioned to face the gate electrode 60, and a drain region 64d and a source region 64s, in which an impurity is charged, are formed on both sides of the channel region 64.

The drain region 64d of the active layer 64 is connected to a drain electrode 70, which also serves as the data line, through a contact hole which is formed in an interlayer insulating film 68 to cover the gate electrode 60.

A planarization insulating film 72 is formed to cover the area above drain electrode and data line 70, and the source region 64s of the active layer 64 is connected to a pixel electrode 74, which is formed on the planarization insulating film 72 of ITO (indium tin oxide) or the like, through the contact hole.

The source region 64s of the active layer 64 also serves as a first electrode 80 of the storage capacitor Csc disposed for each pixel and extends from the contact region with the pixel electrode 74 as shown in FIG. 2. A second electrode 84 of the storage capacitor Csc is simultaneously formed of the same layer as the gate electrode 60 as shown in FIG. 3, in a distinct region separated from that of the gate electrode 60 by a prescribed gap. A dielectric substance between the first electrode 80 and the second electrode 84 is also served by the gate insulating film 66. The second electrode 84 of the storage capacitor Csc, which is not independent for each pixel, extends on the pixel region in the line direction in the same way as the gate line 60 as shown in FIG. 2. To this second electrode 84 is applied a predetermined storage capacitor voltage Vsc.

Thus, a storage capacitor Csc is disposed for each pixel to hold an electric charge corresponding to the display content which must be applied to the liquid crystal capacitor Clc during a TFT non-selection period. As a result, it is made possible to suppress a potential change of the pixel electrode 74 and to maintain the display content.

In applications in which it is required the display device be compact and have a high resolution, the area per pixel must be made small, and, as a consequence, the liquid crystal capacitor Clc per pixel becomes small. Therefore, a storage capacitor Csc such as described above must be provided to ensure that the display data of each pixel is maintained during the unit display period.

However, because the storage capacitor Csc does not function as a display region, reduction of the displayable area per pixel, namely, a reduction in aperture ratio, cannot be avoided in a transparent type LCD. Especially, when the second electrode 84 of the storage capacitor Csc is formed on the same layer as the gate line 60 as shown in FIG. 2 and FIG. 3, an insulating space is required to prevent the gate line 60 and the second electrode 84 from being short-circuited. Furthermore, because the second electrode region is formed of the same material as the gate, it is also opaque. As a consequence, aperture ratio is further lowered accordingly and producing a bright display becomes even more difficult.

Still further, a conventional LCD is provided with a black matrix for shielding light between the pixels in order to improve the contrast of the screen in the region between pixels. This matrix is, typically provided, in addition to the above storage capacitor Csc, on the second substrate which is disposed to face the first substrate on which the TFT is formed. The LCD is formed by bonding the first substrate and the second substrate and sealing liquid crystal in the gap between them as described above, and, in order to avoid variations in the aperture ratio of the respective pixels caused by displacement of the bonded substrates, either the black matrix is made to have a larger width or small pixel regions (e.g., pixel electrode) are formed. This further exacerbates the problem of the aperture ratio.

SUMMARY OF THE INVENTION

To address the above problems, it is an object of the present invention to provide an active matrix display device which simultaneously provides adequate storage capacitance and a high aperture ratio.

In order to achieve the aforementioned object, the present invention is directed to an active matrix display device having a thin-film transistor (TFT) and a storage capacitor in respective pixels, wherein the TFT is formed on a substrate as a top gate type for each pixel; a first electrode of the storage capacitor is electrically connected to an active layer of the TFT; and a second electrode of the storage capacitor is formed to partly overlap at least the active layer of the TFT with an insulating layer provided between the active layer and the substrate.

Another aspect of the invention is directed to an active matrix display device which has a TFT, a liquid crystal capacitor and a storage capacitor in respective pixels and drives liquid crystal sealed in a gap between first and second substrates to display data, wherein the TFT is formed on the liquid crystal-opposed side of the first substrate as a top gate type and the storage capacitor is formed in a region formed between a first electrode which is also served by an active layer of the TFT and a second electrode which is disposed with an insulating film held between the active layer of the TFT and the first substrate.

As described above, the first electrode of the storage capacitor is connected to, or serves as, the active layer of the TFT, and the second electrode is disposed, not on the same layer as a gate line, but, rather, below the first electrode. Therefore, a storage capacitor Csc having a sufficient size can be formed for each pixel without lowering the aperture ratio.

In the active matrix display device according to another aspect of the invention, the second electrode of the storage capacitor is provided with a light-shielding function.

In the active matrix display device according to still another aspect of the invention, the second electrode of the storage capacitor is formed of a light-shielding material in a region excluding a pixel aperture region.

In the active matrix display device according to still another aspect of the invention, the second electrode of the storage capacitor is formed in a region excluding a pixel aperture region and also serves as a black matrix.

When the second electrode of the storage capacitor disposed below the active layer of the TFT is lightproof, an optical leak current can be prevented from being generated due to outside light incident from the lower position of the active layer. A black matrix preventing the occurrence of an optical leak current in the TFT can also enhance the display contrast.

Using the second electrode as the black matrix can additionally enhance the contrast without lowering the aperture ratio.

In the above active matrix display devices, a polycrystallized polysilicon layer can be made the active layer of the TFT by laser irradiation of a formed amorphous silicon layer.

When the second electrode layer is uniformly formed on the active layer region of the amorphous silicon layer, and particularly below the TFT channel region, annealing conditions for the channel region are uniform during laser annealing for polycrystallization. Therefore, the polysilicon layer has a uniform grain size, and variations in the properties among the TFTs can be prevented.

Another aspect of the invention is directed to an active matrix display device, wherein each of pixels disposed in a matrix is configured in the vicinity of an intersection of a gate line and a data line and provided with a thin-film transistor, a display element, and a storage capacitor; the thin-film transistor is formed on a substrate as a top gate type in each pixel; a first electrode of the storage capacitor is configured with an active layer of the thin-film transistor extended along the data line; and a second electrode of the storage capacitor is formed to overlap with an insulating layer held between the first electrode and the substrate.

As described above, the second electrode of the storage capacitor is arranged on a layer different from that of the gate line and below the first electrode extended from the active layer of the TFT. Thus, it is not necessary to provide a significant insulating space between the second electrode and the gate line, and a region where the first electrode integral with the active layer and the second electrode are overlapped can be efficiently made larger. The region along the data line is mostly a non-display region, and, when the storage capacitor is formed by arranging the first electrode on such a region, a large capacitor can be obtained easily and without lowering the aperture ratio. When the first electrode and the data line which are positioned vertically with the insulating layer therebetween are arranged so as not to overlap in the same plane, coupling between the data line and the first electrode can be prevented.

Another aspect of the invention is directed to an active matrix display device, wherein each of pixels disposed in a matrix is configured in the vicinity of an intersection of a gate line and a data line and provided with a thin-film transistor, a display element, and a storage capacitor; the thin-film transistor is formed on a substrate as a top gate type in each pixel; a first electrode of the storage capacitor is configured with an active layer of the thin-film transistor extended to a region below the data line; a second electrode of the storage capacitor is formed between the first electrode and the substrate to overlap with the first electrode and an insulating layer held between them; and a conductive shielding layer is formed in the region where the data line and the first electrode of the storage capacitor overlap with an insulating layer held between the data line and the first electrode.

Lowering of the aperture ratio due to the formation of the storage capacitor can be minimized by disposing the first electrode and the second electrode of the storage capacitor below the data line forming region, and coupling between the first electrode and the data line can be prevented by disposing the conductive shield layer between the data line and the first electrode. The storage capacitor can also be configured between the first electrode and the conductive shield layer.

In the active matrix display device according to another aspect of the invention, the conductive shielding layer is also served by the gate line which supplies the thin-film transistors of the pixels of another row with a selection signal.

Thus, when the conductive shield layer is served by the gate line of the next stage, a storage capacitor which is not affected by a data line voltage can be configured below the data line without increasing the steps. Because the gate line also serves as the conductive shield layer, it is not necessary to consider an allowance or the layout for securing the insulation between the gate line and the conductive shield layer, and the conductive shield layer can be formed in a minimum space.

Another aspect of the invention is directed to an active matrix display device, wherein each of pixels disposed in a matrix is configured in the vicinity of an intersection of a gate line and a data line and provided with a thin-film transistor, a display element, and a storage capacitor; the thin-film transistor is formed on a substrate as a top gate type in each pixel; a first electrode of the storage capacitor is formed of a semiconductor layer which configures an active layer of the thin-film transistor; a second electrode of the storage capacitor is formed between the first electrode and the substrate to overlap with the first electrode and an insulating layer held between them; and the second electrode is provided with a black matrix function for shielding light between the respective pixels and has at least a channel region of the thin-film transistor of the respective pixels opened.

As described above, according to the present invention, the second electrode of the storage capacitor is arranged on a layer different from that of the gate line and below (on the substrate side) the first electrode formed of a semiconductor layer which configures the active layer of the TFT. When the second electrode is functioned as the black matrix, decrease of the aperture ratio of each pixel due to the displacement of the two bonded substrates can be prevented to a greater extent than when the black matrix is formed on another substrate or the like. The storage capacitor can be efficiently formed in the pixel and the aperture ratio can be improved with a sufficient capacitor secured without necessity of considering a sufficient insulating space between the second electrode and the gate line. Furthermore, the second electrode is open in the channel region of at least the thin-film transistor, so that, when the amorphous semiconductor layer such as an amorphous silicon layer to be described later is polycrystallized by laser annealing so to be used as the active layer, it is not necessary to adjust the annealing conditions of the channel region which largely affect the thin-film transistor characteristics in compliance with the properties when the second electrode is present on the lower layer. Even when the driver section which is provided with the same thin-film transistor as the pixel section is built in the periphery of the substrate, the second electrode is open in the channel region of the thin-film transistor of the pixel section, so that the thin-film transistor of the driver section and the above thin-film transistor of the pixel section can be formed under the same conditions.

In the active matrix display device according to another aspect of the invention, a light shielding layer is formed above a non-opposing side of the active layer to the second electrode at least in the channel region of the thin-film transistor having the second electrode which also serves as the open black matrix protecting the channel region from light.

In the active matrix display device according to still another aspect of the invention, the light-shielding layer is also served by the data line.

Because the vicinity of the channel region having the second electrode open is shielded from light by another shielding layer, lowering of the contrast of the image light due to a leak of light in the vicinity of this channel region can be reliably prevented. Furthermore, because the channel region of the active layer is shielded from light, the occurrence of light leakage on the transistor due to light irradiated to the channel region of each thin-film transistor can also be prevented. Because the data line serves as the light-shielding layer, this region can be shielded from light without adding a special step.

In the active matrix display device according to another aspect of the invention, a polysilicon layer which is polycrystallized by laser irradiation to a formed amorphous silicon layer is used for the active layer of the thin-film transistor.

When laser-annealing for polycrystallization, a difference in thermal capacity in the active layer region of the amorphous silicon layer, and particularly below the TFT channel region, results in a difference in grain size. However the annealing conditions for the channel region can be made uniform by opening the second electrode in the channel region of each TFT. Therefore, the polysilicon layer has a uniform particle diameter, and variations in the properties among the TFTs can be prevented.

Another aspect of the invention is directed to a driver built-in type active matrix display device, wherein a pixel section and a driver section are disposed on the same substrate; the pixel section is provided with a plurality of pixels arranged, and each pixel has a pixel section thin-film transistor, a display element and a storage capacitor; the pixel section thin-film transistor is formed as a top gate type transistor on the substrate of each pixel; a first electrode of the storage capacitor is electrically connected to an active layer of the pixel section thin-film transistor; a second electrode of the storage capacitor is formed to partly overlap at least the active layer of the pixel section thin-film transistor with an insulating layer held between the active layer and the substrate; the driver section has a plurality of driver section thin-film transistors which output a signal for driving the respective pixels of the pixel section; the driver section thin-film transistor is configured as a top gate type transistor on the substrate; an active layer of the driver section thin-film transistor is configured of the same material layer as the active layer of the pixel section thin-film transistor; and a conductive layer which is formed of the same material as the second electrode is disposed between the active layer of the driver section thin-film transistor and the substrate with the insulating layer held between them.

Another aspect of the invention is directed to a driver built-in type active matrix display device which drives liquid crystal sealed in a gap between first and second substrates to display data, wherein a pixel section and a driver section are disposed on the same substrate; the pixel section is provided with a plurality of pixels, each of which has a pixel section thin-film transistor, a liquid crystal capacitor and a storage capacitor; the pixel section thin-film transistor is formed as a top gate type transistor for each pixel on the liquid crystal opposing side of the first substrate; the storage capacitor is formed in a region formed between a first electrode which is also served by an active layer of the pixel section thin-film transistor, and a second electrode which is disposed to oppose the first electrode with an insulating layer held between them and also disposed between the active layer of the pixel section thin-film transistor and the substrate; the driver section has a plurality of driver section thin-film transistors which output a signal for driving each pixel of the pixel section; and the driver section thin-film transistor is configured as a top gate type transistor on the substrate, an active layer of the driver section thin-film transistor is configured of the same material layer as the active layer of the pixel section thin-film transistor, and a conductive layer which is formed of the same material as the second electrode is disposed between the active layer of the driver section thin-film transistor and the substrate with the insulating layer held between the active layer and the conductive layer.

As described above, the first electrode of the storage capacitor is connected to (or serves as) the active layer of the thin-film transistor, and the second electrode is disposed, not on the same layer as the gate line, but below (on the substrate side) the first electrode, so that a storage capacitor Csc having an adequate size can be formed on each pixel without lowering the aperture ratio. The conductive layer which is formed of the same material as the second electrode of the storage capacitor is also formed below (the substrate side) the active layer with respect to the thin-film transistor of the driver section having the active layer which is made of the same material as the active layer of the TFT of the pixel section on the same substrate. Therefore, the conditions for forming the same material layer which configures the active layer of the thin-film transistor of the pixel section and the active layer of the thin-film transistor of the driver section become the same between both transistors, and it becomes possible to produce transistors having identical properties.

In any of the above driver built-in type active matrix display devices according to another aspect of the invention, a polysilicon layer which is polycrystallized by laser irradiation to a formed amorphous silicon layer is used for the pixel section and the active layer of the driver section thin-film transistor.

When the amorphous silicon layer is polycrystallized by laser annealing, the polysilicon layer, which is finally obtained under the conditions such as thermal conductivity in a region where the silicon layer is formed, has a varying particle diameter. When the conductive layer is disposed similarly below (on the substrate side) the active layer of both of the thin-film transistors of the pixel section and the driver section as in the present invention, the particle diameter of the polysilicon layer formed by laser annealing can be prevented from becoming different between the active layers of both transistors, and the transistors having the identical properties can be formed.

In the driver built-in type active matrix display device according to another aspect of the invention, the plurality of driver section thin-film transistors have an n-type channel transistor and a p-type channel transistor which are of different conduction types, and the conductive layer formed between the active layer and the substrate of the n-type channel transistor and the conductive layer formed between the active layer and the substrate of the p-type channel transistor are controlled.

In the thin-film transistor of the driver section which is configured as a top gate transistor, an effect on the transistor caused by the potential of the conductive layer existing below the active layer differs depending on whether the conductive type of the transistor is a p type or an n type. Therefore, a leakage current due to the occurrence of a back channel can be prevented by ensuring an appropriate potential by respectively controlling the potential of the conductive layer disposed below (on the substrate side) the active layer of the thin-film transistor of the driver section with respect to the p-type and n-type transistors according to the present invention.

DETAILED DESCRIPTION OF THE PREFERRED EMBODIMENTS

Preferred embodiments (hereinafter called the embodiments) of the present invention will be described with reference to the accompanying drawings. As the display device, a liquid crystal display device (LCD) will be described. The LCD is configured of a first substrate and a second substrate which are formed of a transparent insulating material such as glass and bonded to each other with liquid crystal held between them.

[Embodiment 1]

The example active matrix LCD according to the first embodiment of the present invention has a pixel section in which each TFT is provided on a first substrate and a driver section for driving the pixel section formed on the periphery of the pixel section on the same substrate.

Figure 4:
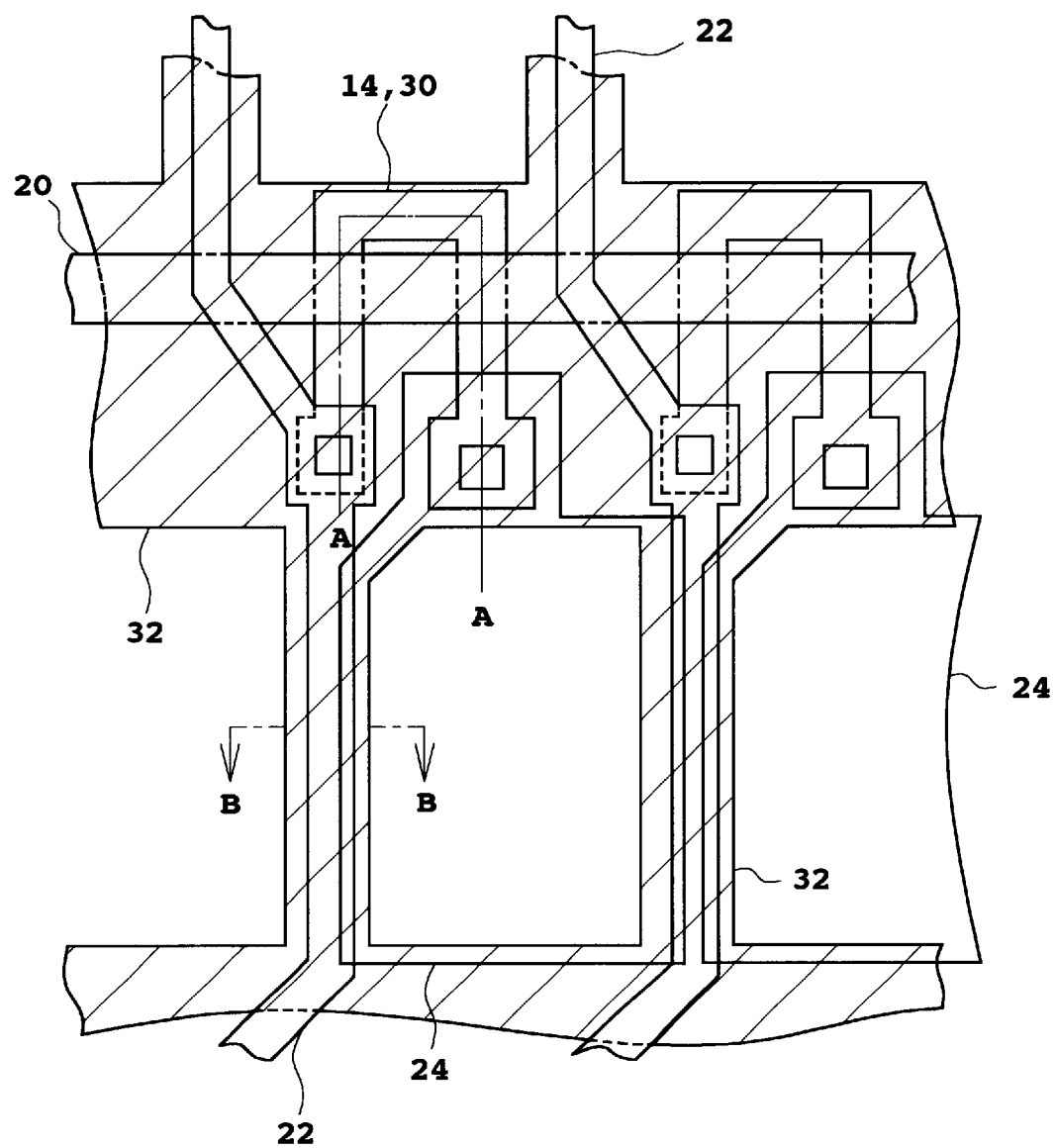
FIG. 4 is a diagram showing a schematic plan structure of the pixel section of an active matrix liquid crystal display device according to a first embodiment of the present invention.
Figure 5:
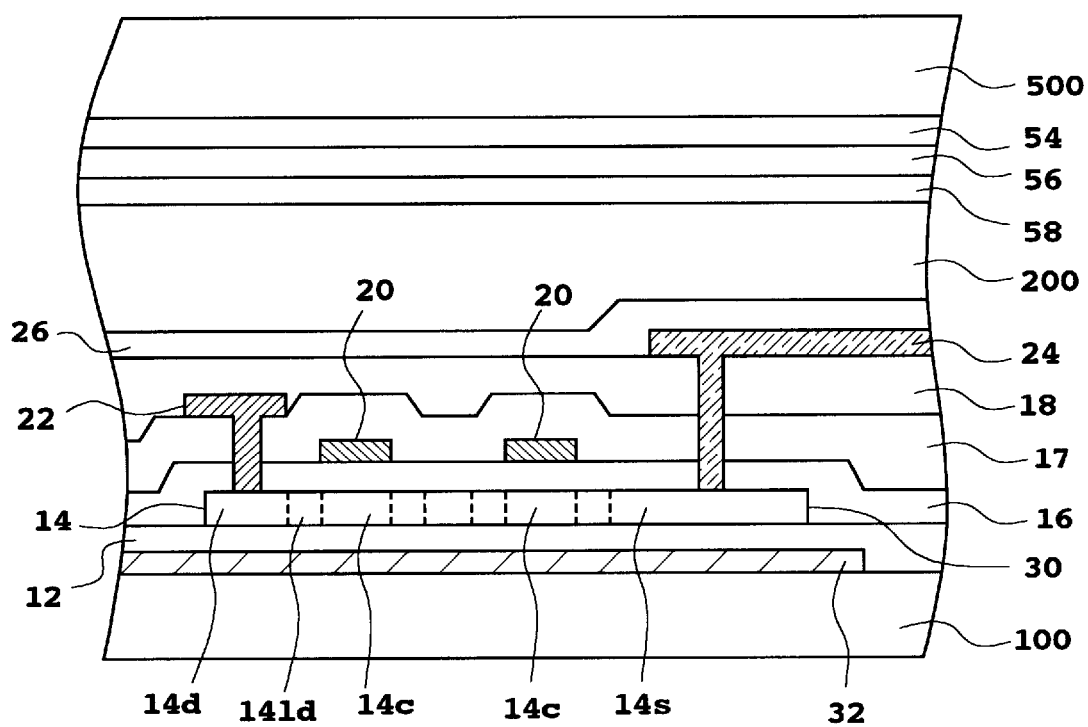
FIG. 5 is a diagram showing a schematic sectional structure of the liquid crystal display device along line A—A of FIG. 4.
Figure 6:
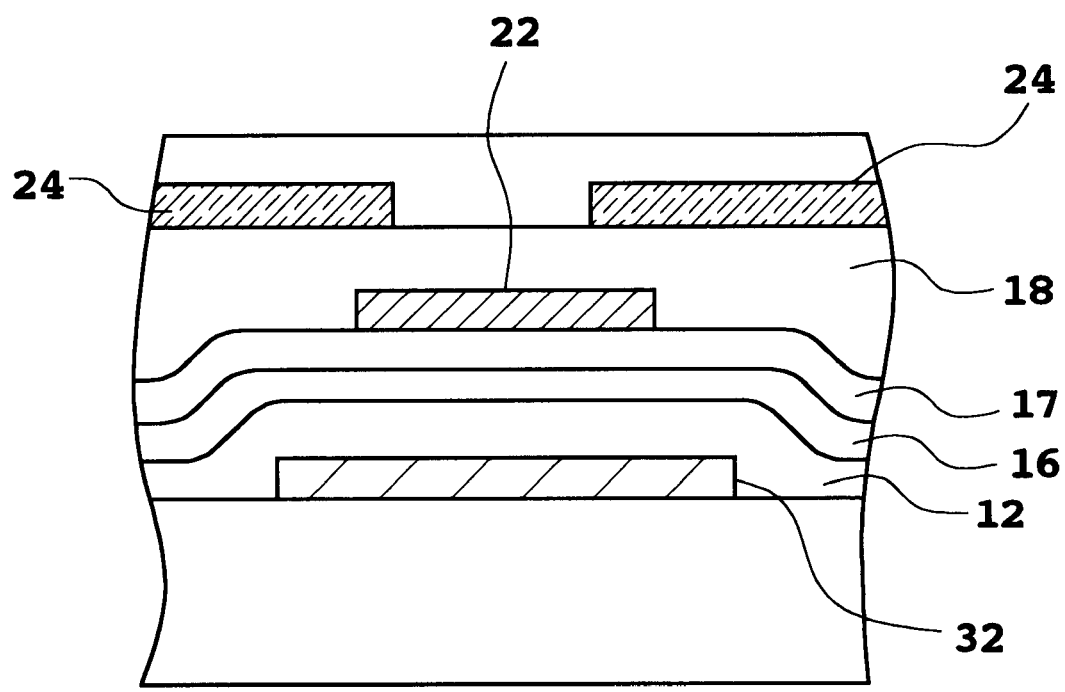
FIG. 6 is a diagram showing a schematic sectional structure on the side of a first substrate of the liquid crystal display device along line B—B of FIG. 4.

First, the pixel section will be described. FIG. 4 shows a plan structure of the pixel section of the LCD according to the first embodiment, FIG. 5 shows the structure of the LCD along line A—A of FIG. 4, and FIG. 6 shows the structure of the first substrate along line B—B of FIG. 4.

Figure 1:
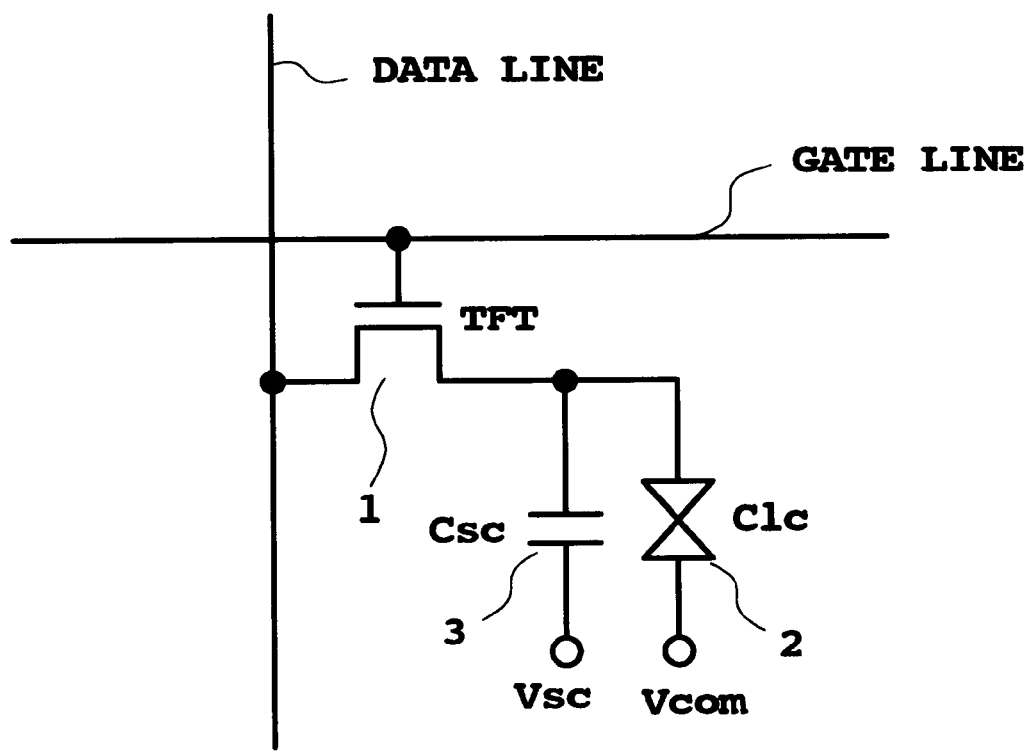
FIG. 1 is a diagram showing an equivalent circuit of a pixel of an active matrix liquid crystal display device.

The equivalent circuit of each pixel is the same as that illustrated in FIG. 1 described above, pixel electrodes 24 are arranged in a matrix on a first substrate 100 as shown in FIG. 4, and a top gate type TFT 1 and a storage capacitor 3 (Csc) are disposed in correspondence with each pixel electrode 24. In each pixel, an active layer 14 of the TFT 1 intersects a gate line 20 which bends and extends in a row direction, the active layer 14 has a channel region 14c formed at the intersection, and the gate of the gate line 20 is provided at the intersection. A drain (or source) 14d is connected to a data line 22 which extends in a column direction, and a source (or drain) 14s has a liquid crystal capacitor 2 (Clc) and a storage capacitor Csc connected in parallel. The equivalent circuit of each pixel is substantially the same as the one shown in FIG. 1, but in this embodiment, the TFT of each pixel is a multi-gate type TFT and has a common gate, and plural TFT active layers are electrically connected in series between the data line and the pixel electrode. The display device may be configured to have a single TFT for each pixel in the same manner as the device shown in FIG. 1.

The liquid crystal capacitor (display capacitor) Clc which is connected to the source of the TFT 1 of each pixel is configured between the pixel electrode 24 to which a voltage according to the display content is applied and an opposing electrode (common electrode) 56 to which a common potential Vcom is applied. The liquid crystal 200 held between these two electrodes.

The storage capacitor Csc is formed in a region where a first electrode 30 and a second electrode 32 are overlaid with an insulating layer 12 held between them. The first electrode 30 is served by the active layer 14 of the TFT 1, and the second electrode 32 is formed on the first substrate 100 and extends below the active layer 14 with the insulating film (buffer layer) 12 held between the second electrode 32 and the active layer 14. Thus, the second electrode 32 extends over the whole region below the active layer 14, so that the active layer of the TFT can function as the first electrode 30, and a special large region is not required for the storage capacitor Csc. A voltage according to the display content supplied from the data line 22 through the TFT 1 is applied to the first electrode 30, and a storage capacitor voltage Vsc which is common in, for example, the display region is applied to the second electrode 32.

The material for the second electrode 32 of the storage capacitor Csc is not limited to a gate material because it is not required to be the same layer as the gate line unlike the second electrode of a conventional storage capacitor. Therefore, as long as the conductor is a conductive material, the material is not limited to a metallic material, which is a good conductor and shields light, and a transparent conductive material such as ITO can be used. A light-shielding metallic material is used to form the second electrode 32 in this embodiment. Because the second electrode 32 is light shielding, the incident light from the first substrate side can be prevented from reaching the active layer 14 of the top gate type TFT 1, light leakage current of the TFT can be decreased, and the display contrast can be further improved.

In this embodiment, the storage capacitor Csc can be formed to have a sufficient capacity without forming it in a region different from the TFT in the plane as described above. However, if the capacity value of the storage capacitor Csc is insufficient, it is desirable that the region of the first electrode 30, namely the area of the source region 14s of the active layer 14, be increased, so to be extended to the region between, for example, the adjacent pixel electrode 24 as in the embodiment to be described later.

Figure 2:
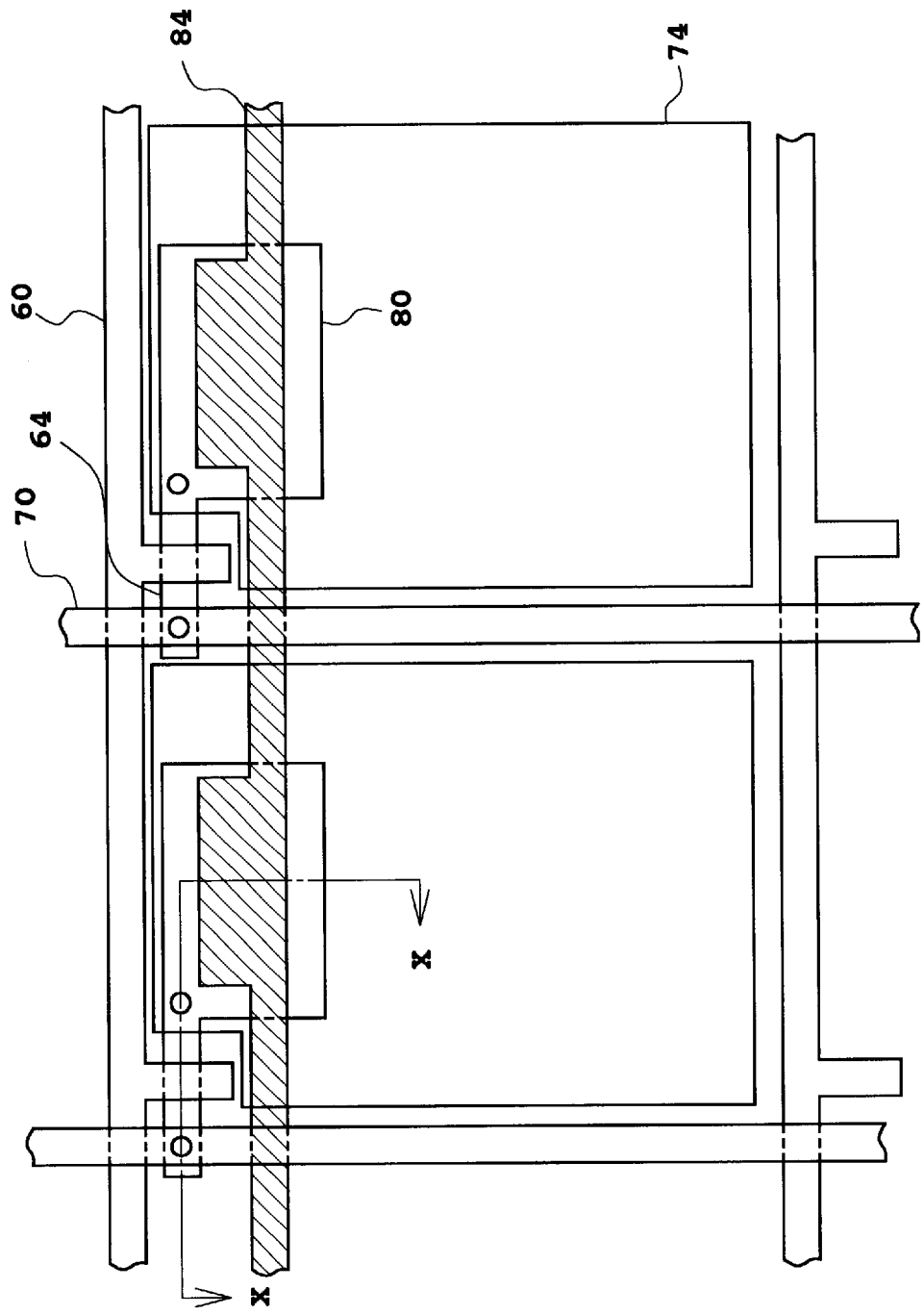
FIG. 2 is a diagram showing a schematic plan structure of a pixel region of a conventional active matrix liquid crystal display device.
Figure 3:
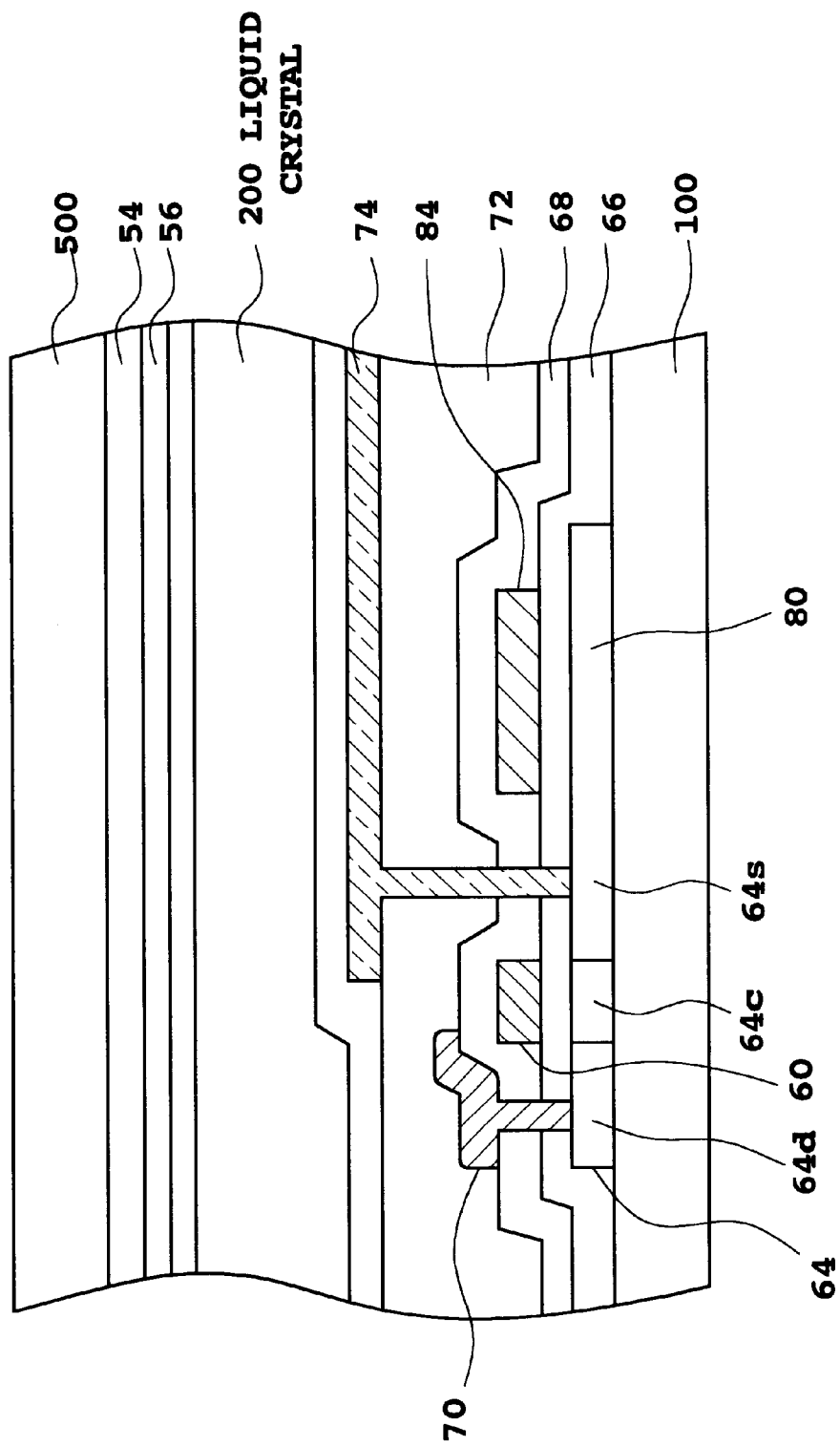
FIG. 3 is a diagram showing a schematic sectional structure of the conventional liquid crystal display device along line X—X of FIG. 2.

In this embodiment, the second electrode 32 is configured to have a pattern that not only overlaps a layer (first electrode 30) which is electrically connected to the TFT active layer 14, but which also overlaps a channel region of at least the active layer 14. This second electrode 32 is also desirable as a light-shielding layer. In the layout shown in FIG. 4, a gate line 20 extends in the row direction, the active layer 14 of the TFT 1 has a pattern which extends from the vicinity of the lower layer of the data line 22 and continues under the gate line 20 (twice in the example shown in FIG. 4), and the channel region 14c is formed in a region intersecting with the gate line 20. Accordingly, the second electrode 32 of the storage capacitor Csc, which also serves to shield the active layer 14 of the TFT against light, is preferably formed in the channel region, namely the region which overlaps the gate (gate line) forming region. Considering alignment clearance, it is more preferable to form the region below the gate line with a width slightly larger than that of the gate line (e.g., +2 $\mu$m on either side). The second electrode 32 having the above pattern is suitable as a light-shielding layer, and, because it overlaps the active layer 14 of the TFT 1 which also serves as the first electrode 30 at most positions, a large storage capacitor Csc can be configured even when the first electrode 30 is not extended from the source region 14s of the TFT as shown in FIG. 2. As such, the storage capacitor Csc can be formed efficiently in a small area.

Here, as the active layer 14 of the TFT 1, a polysilicon (p-Si) layer which may be polycrystallized by laser annealing as described below can be adopted. In such a case, the second electrode 32 of the storage capacitor Csc is present below the p-Si layer, so that it is possible to have the same grain size of the polycrystal and to form the TFT with less variations in properties.

This can be accomplished because, when amorphous silicon is polycrystallized by laser annealing, the annealing conditions vary when there is a difference in thermal conductivity of the lower layer of the amorphous silicon film, such that the grain size in the active layer 14 becomes variable. Especially, variations in the grain size within the channel region exert a large effect on the TFT properties. For the second electrode 32 of the storage capacitor Csc formed below the active layer 14, Cr or the like which is a metal (refractory metal) with a high melting point can be used. However, because the Cr or the like has thermal conductivity higher than that of glass configuring the first substrate and, when forming the p-Si active layer 14 by laser annealing, the presence or the absence of a second electrode 32 having a high thermal conductivity below the active layer 14 is not desirable, in the example of this embodiment, the second electrode 32 is uniformly disposed below at least the channel region of the active layer 14 as shown in FIG. 4 and FIG. 5 to provide uniform conditions for annealing to the amorphous silicon layer, thereby suppressing variation of the properties of the TFTs.

To achieve the object described above, the second electrode 32 may be disposed below only the active layer. However, the example used to illustrate this embodiment adopts a pattern for the second electrode 32 as shown in FIG. 4 wherein only a region corresponding to the pixel electrode is opened in the display region and the other regions are covered. When a light-shielding material used for the second electrode 32 thas the matrix pattern as shown in FIG. 4, the area superimposed with the active layer 14 can be increased (the storage capacitor is increased), and the active layer 14 can be securely shielded from light. Furthermore, by employing the above pattern, the second electrode 32 can be used as the black matrix of the panel. Specifically, to use the outside (the lower side of FIG. 5) of the first substrate as an observation surface of the display device or the lamp of a projector, the first substrate can be disposed on the side of the light source. With such a configuration, irradiation of light to the active layer 14 can be prevented and contrast can be further improved.

In this embodiment, the storage capacitor Csc of sufficient capacity can be formed without forming it in a region different from the TFT when seen in the plane. However, if the capacity value of the storage capacitor Csc is insufficient, the region of the first electrode 30, namely the area of the source region 14s of the active layer 14, can be increased, so to be extended to the region between, for example, the adjacent pixel electrode 24.

Figure 7:
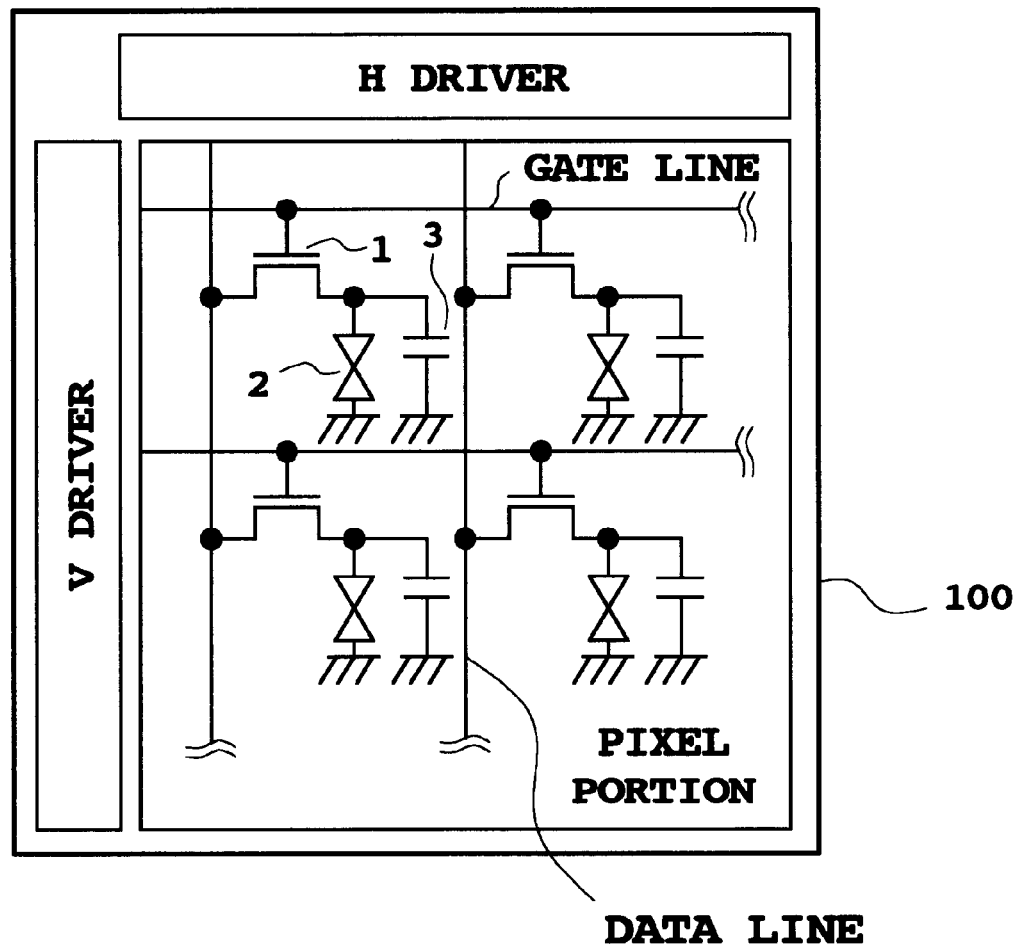
FIG. 7 is a diagram showing a schematic structure of a driver built-in type active matrix LCD according to the present invention.
Figure 8:
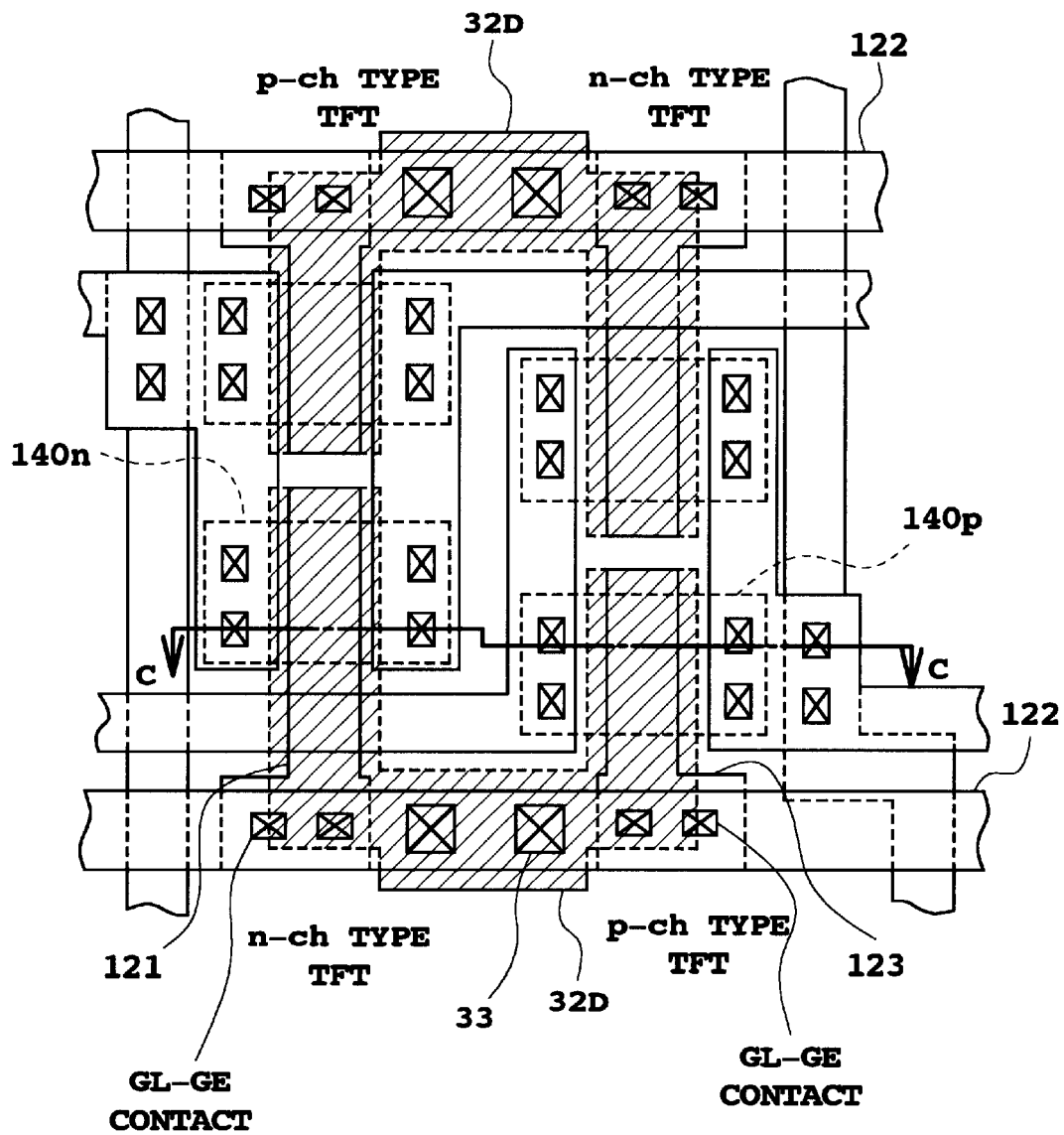
FIG. 8 is a diagram showing a first example structure of part of a built-in driver section of an active matrix liquid crystal display device according to the first embodiment of the present invention.
Figure 9:
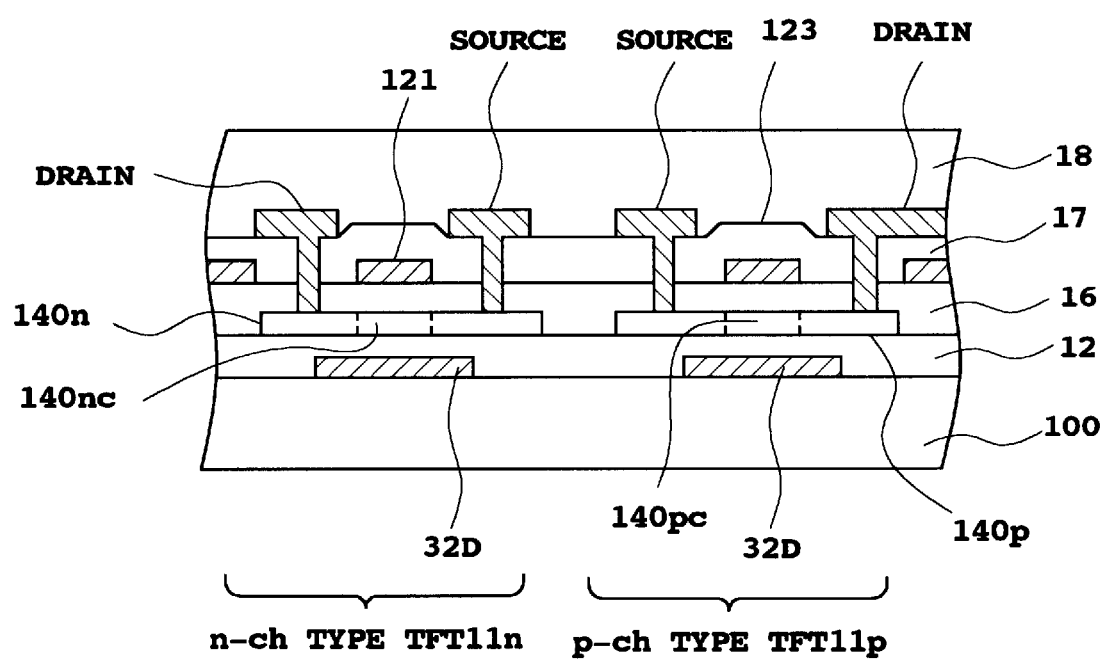
FIG. 9 is a diagram showing a sectional structure along line C—C of FIG. 8.

A first example of the built-in driver section which is formed in the periphery of the pixel section to drive the aforementioned pixel section will next be described. FIG. 7 shows a schematic structure of a driver built-in type active matrix LCD, FIG. 8 shows a plan structure in part of the built-in type driver section, and FIG. 9 shows a schematic sectional structure taken along line C—C of FIG. 8. The same reference numerals are used to indicate components which have been described above and their description will not be repeated. In FIG. 8, a total of four n-ch type and p-ch type TFTs are disposed. Each TFT is configured of the same top gate type transistor as the TFTs of the pixel section shown in FIG. 9. Furthermore, the same material for the TFTs of the pixel section is used for active layers 140n, 140p of the TFTs of the driver section. Specifically, in this example, polysilicon is formed by crystallizing amorphous silicon by a low-temperature process such as laser annealing, and the polysilicon is used for active layers 140 (140n, 140p) of TFTs 11 (11n, 11p) of the driver section.

In this embodiment, conductive layers 32D are formed below at least channel regions 140c (140nc, 140pc) of the active layers 140 which are formed of the same material as the active layer of the pixel section TFT with an insulating film 12 held between them. The conductive layer 32D is formed of the same material as the second electrode 32 of the storage capacitor Csc disposed below the active layer 14 of the pixel section TFT. This material may be, for example, a high melting point metal. The driver section is not required to have a light-shielding layer below the active layer because it is not exposed to light as is the pixel section TFT (leakage of light in the driver section can be reliably prevented from occurring by appropriate shielding). Each TFT of the driver section may often have a data holding time shorter than that of the pixel section TFT, and it is not necessary to form the storage capacitor between the conductive layer 32D and the active layer of the driver section TFT, although the storage capacitor may be configured. In this embodiment, this conductive layer 32D has a role in providing the polycrystallizing conditions for the active layer 14 of the pixel section TFT and for the active layer 140 of the driver section TFT which are made equal, by disposing them at least on the channel lower layer of the active layer 140 of the driver section TFT 11 which is formed of the same material as the pixel section TFT in the polycrystallizing step to form the active layer 140 by polycrystallizing amorphous silicon. The grain size of the polycrystalline active layer is made equal between the polycrystalline TFT of the pixel section and the polycrystalline TFT of the driver section by the conductive layer 32D, thereby providing the same TFT properties to facilitate the control.

In the first example, to the conductive layer 32D is applied the same voltage as the gate voltage of the TFT of the active layer 140 over which the conductive layer 32D is overlapped. In FIG. 8, for example, gate electrodes 121, 123 of the n-ch type and p-ch type TFTs are connected to the same gate line 122, and the conductive layer 32D formed below these TFTs is connected to the same gate line 122 through the contact hole 33. In other words, a gate signal of either the n-ch type or p-ch type TFT is input to the conductive layer 32D, and each TFT is configured as a dual gate TFT in the same manner as the structure having the gates vertically with the active layer 140 held between them. In the n-ch type TFT and the p-ch type TFT, because an operation threshold voltage has an opposite polarity, when a prescribed common voltage is applied to all the conductive layers 32D as in the pixel section or the potentials of the conductive layers 32D are floating, there is a possibility that either of the n-type or p-type TFT of the driver section may operates unstably. However, adverse effect of such instability on the TFT operation can be reliably prevented without disposing a special structure by determining that the voltage of the conductive layer 32D is a gate voltage of the corresponding TFT. Rather, the operation property such as an operation speed can be improved by providing a properly configured a dual gate type TFT.

Figure 10:
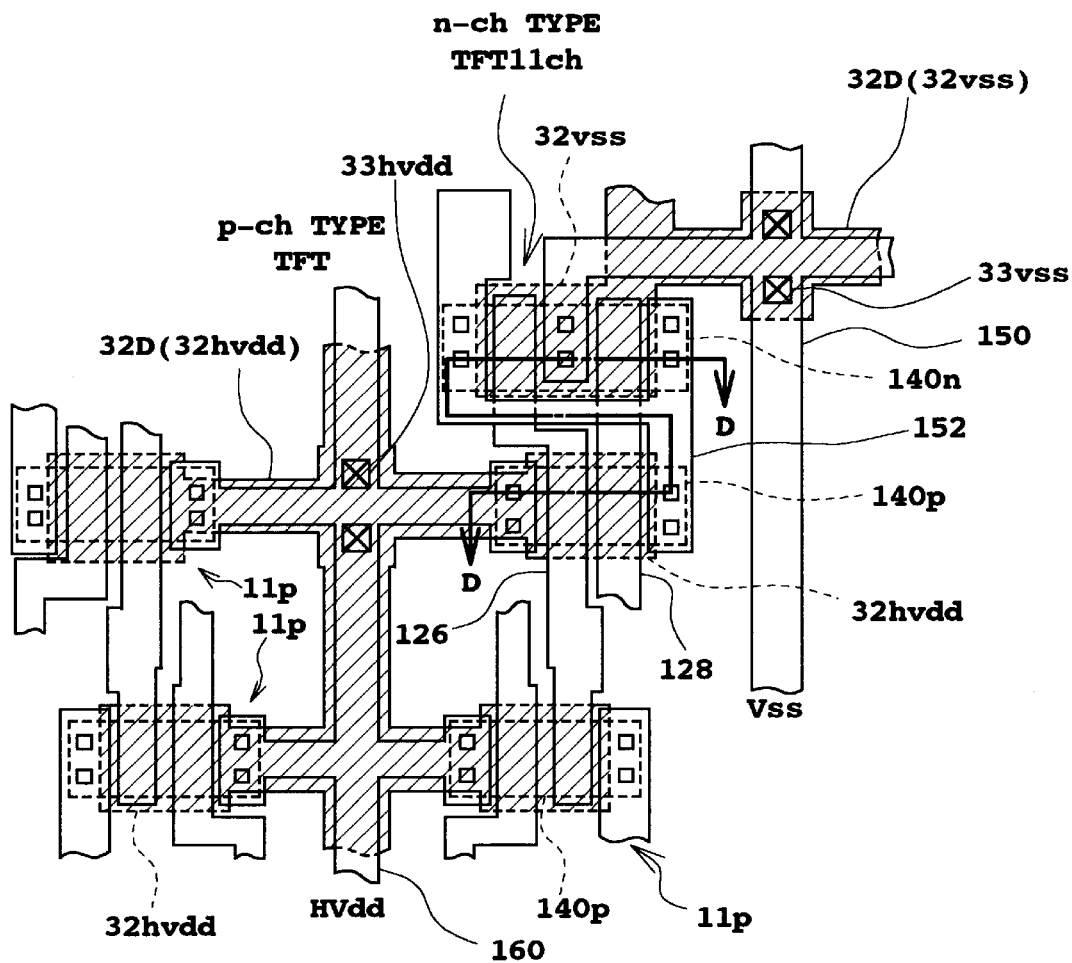
FIG. 10 is a diagram showing a second example structure of part of a built-in driver section of an active matrix liquid crystal display device according to the first embodiment of the present invention.
Figure 11:
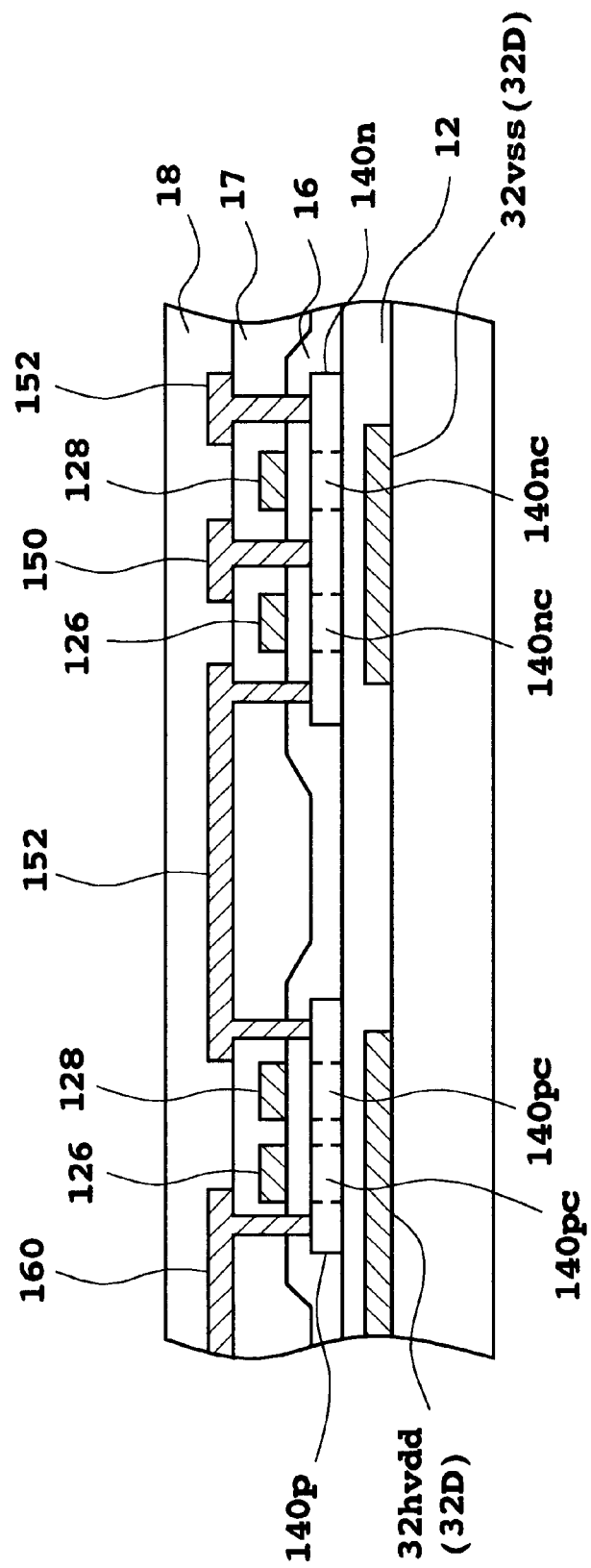
FIG. 11 is a diagram showing a sectional structure along line D—D of FIG. 10.

A second example of the conductive layer 32D of the driver section TFT will be described with reference to FIG. 10 and FIG. 11. FIG. 10 shows the structure of part of the driver section, and FIG. 11 shows a sectional structure along line D—D of FIG. 10. In the second example, the n-ch type TFT and the p-ch type TFT are used in the driver section in the same manner as the first example. Also similar to the first example, either of the active layers 140 (140n, 140p is configured of the same material layer (polysilicon layer) as the active layer 14 of the pixel section TFT in the same way as the first example. The conductive layer 32D formed of the same material as the second electrode 32 of the storage capacitor of the pixel section is formed in the position to overlap at least the respective channel regions 140nc, 140pc with the insulating film 12 between them below each active layer 140.

A difference from the first example is that the voltage applied to the conductive layer 32D below the active layer 140 is separately controlled between the n-ch type TFT and the p-ch type TFT. Specifically, the conductive layer 32D (32vss) formed below the active layer 140n of then-ch type TFT is connected to a low-voltage power line 150 through a contact 33vss in the example shown in FIG. 10, and a low voltage Vss is applied to it. Conversely, the conductive layer 32D formed below the active layer 140p of the p-ch type TFT is connected to a high-voltage power line 160 through a contact 33hvdd, and a high voltage HVdd is applied to it. Therefore, the conductive layer 32vss prevents the n-ch type TFT from being turned on by the generation of a back channel, and turning on of the p-ch type TFT as a result of generation of a back channel is prevented by the conductive layer 32hvdd.

In FIG. 10 and FIG. 11, reference numerals 126 and 128 denote TFT gate electrodes, and reference numeral 152 denotes output lines of the n-ch type and p-ch type TFTs having a CMOS structure.

In the second example shown in FIG. 10 and FIG. 11, the conductive layer 32D, the same as the second electrode of the storage capacitor Csc of the pixel section TFT, is disposed below the active layer 140 of the driver section TFT, and the polycrystallizing conditions for the active layer 14 of the pixel section TFT and the polycrystallizing conditions for the active layer 140 of the driver section TFT are made equal in the polycrystallizing step to form the active layer 140 by polycrystallizing amorphous silicon. Furthermore, by applying a low voltage Vss to the conductive layer 32D below the n-ch type TFT and by applying a high voltage HVdd to the conductive layer 32D of the p-ch type TFT, operation of the n-ch type and p-ch type TFTs when no desired gate signal is applied to the gate electrodes 122, 124 is prevented.

Next, a method of producing each element on the side of the first substrate of the LCD according to this embodiment will be described.

As the first substrate 100, a transparent insulating substrate made of a material such as glass, quartz, sapphire, or the like can be used. First, a high-melting point metallic layer such as Cr is formed on the first substrate 100, and a second electrode 32 of the storage capacitor is formed in the pixel section by opening a pixel electrode forming scheduled region as shown in FIG. 4. In the driver section, patterning is performed in such a way that a conductive layer 32D remains at a position overlapping the active layer of the TFT formed later as shown in FIG. 7 and FIG. 10.

After the second electrode 32 of the storage capacitor Csc and the conductive layer 32D of the driver section are formed, an insulating layer 12 of $SiO_2$, SiNx or the like is formed on the entire surface of the substrate covering the second electrode 32 and the conductive layer 32D.

An amorphous silicon layer is formed on the insulating layer 12 and excimer laser light is irradiated from a corresponding position above the first substrate 100 in FIG. 5 to anneal the amorphous silicon layer to polycrystallize it. By the excimer laser annealing as described above, the second electrode 32 and the conductive layer 32D are uniformly formed in the pixel section and the driver section respectively below at least the channel forming region of the amorphous silicon layer. Therefore, because the respective channel forming regions are laser-annealed under the same conditions, the particles of the thus-formed polysilicon layer formed in such regions have a uniform particle diameter. After the polycrystallization annealing is completed, the polysilicon layer is patterned into the shapes of the active layers of the pixel section TFT and the driver section TFT and the shape of the first electrode of the storage capacitor. Furthermore, a gate insulating film 16 formed of $SiO_2$ is formed to cover the polysilicon layer.

After the gate insulating film 16 is formed, the metallic layer is formed and patterned using, for example, Cr, to form gate electrodes 121, 123 (or 126, 128) of the driver section TFT. At the same time, a gate line 20 which is integral with the gate electrode can be formed in the pixel section. The gate of the pixel section TFT may also be formed from Al in another step.

Then, the active layers 14, 140 are doped with an impurity from the side of the gate which is used as a mask. Here, in the pixel section TFT, the active layer 14 is doped with an impurity (e.g., phosphorus) at a high concentration with the gate used as a mask, and the active layer 14 is doped at a high concentration with an impurity (e.g., phosphorus) with the gate line 20 covered with a mask having a width larger than the width of the gate line 20. Thus, in the active layer 14, an intrinsic channel region 14c which is not doped with an impurity is formed in a region corresponding to the gate line 20, an LD region 141d which is doped with an impurity at a low concentration is formed on either side of the channel region 14c, and a drain region 14d and a source region 14s in which an impurity is doped at a high concentration are formed on the outside of the LD region.

In the driver section TFT, the same conductive type TFT, e.g., an n-ch type TFT, as the above pixel section TFT can be doped at the same time with the above doping step of the active layer of the pixel section TFT. When this is done, the forming region of the p-ch type TFT is covered with a doping mask, and, after the active layer of the n-ch type TFT is doped, the doping mask covering the forming area of the p-ch type TFT is removed. The active layer 140p is then doped with an impurity such as boron while the driver section n-ch type TFT and the pixel section TFT region is covered with a doping mask.

After the doping step is completed, the doped impurity is activated by performing the annealing process. Then, an interlayer insulating film 17 is formed over the entire surface, and a contact hole is formed through the interlayer insulating film 17 and the gate insulating film 16 in a region (drain in this embodiment) corresponding to the drain region 14d (or the source region 14s) of the TFT 1 in the pixel section and a region corresponding to the drain region and the source region of each TFT of the driver section. Furthermore, a data line 22 which also serves as a drain electrode is formed in the pixel section using Al or the like, and the data line 22 and the drain region 14d of the active layer 14 are connected through the contact hole. At the same time, the drain and source electrodes and the drain region and source region of the TFT are connected through the contact hole using Al or the like in the driver section.

After the required wiring is formed, a planarization insulating film 18 is formed of an acrylic resin or the like on the entire surface of the substrate, a contact hole is formed at a position corresponding to the source region 14s of the TFT 1 through the planarization insulating film 18, the interlayer insulating film 17, and the gate insulation film 16. Furthermore, a transparent conductive material layer of ITO or the like is formed and patterned into a pixel electrode shape to form a pixel electrode 24 which is connected to the source region 14s through the contact hole.

After forming the pixel electrode 24, an alignment film 26 for controlling the alignment of liquid crystal is formed on the entire surface, if required. Thus, the required elements are formed on the side of the first substrate.

For a color display device, a color filter 54 of R, G, B or the like is formed on a second substrate 500, which is a transparent substrate such as glass, plastic, or the like, of the LCD. An opposing electrode (common electrode) 56 made of ITO for applying a voltage to the liquid crystal 200 with the respective pixel electrodes 24 of the first electrode 100 is formed on this color filter 54. An alignment film 58 is also formed on the opposing substrate 6 in the same way as the first substrate 100. In this embodiment, a second electrode 32 of the storage capacitor Csc which can function as the black matrix is formed on the first substrate 100, so that it is not necessary to form a black matrix on the second substrate, as is generally done.

The first substrate 100 and the second substrate 500 which are obtained as described above are bonded along their peripheries with a prescribed gap between them, and the liquid crystal 200 is sealed in the gap between the substrates to complete the LCD. A polarizing film, a phase difference film, or the like is disposed on the exterior of the second substrate 500 (on the top side in FIG. 5).

Although an LCD was used as an example active matrix display device in the above description, the present invention is not limited to such use and can also be applied to any other active matrix display device employing a storage capacitor. For example, the present invention may be applied to an active matrix type electroluminescence display device which uses an EL element as a display element to obtain the same effect.

The first electrode 30 and the second electrode 32 of the storage capacitor Csc in the pixel section are not limited to the patterns shown in FIG. 4 and FIG. 5. Other patterns may be employed as long as the condition that the second electrode overlaps the channel region of at least the active layer 14 is met.

As described above, in the example of this embodiment, the first electrode of the storage capacitor disposed in each pixel of the active matrix display device is served by the active layer of the top gate TFT, and the second electrode of the storage capacitor is formed below the TFT active layer with an insulating film between them. By disposing the second electrode below the active layer of the top gate TFT, the storage capacitor can be overlaid on the TFT forming region which does not contribute to the ordinary display by a translucent display device. Thus, the aperture ratio of the pixel can be improved.

By using the light-shielding material for the second electrode, the active layer of the TFT can be reliably shielded against incident light from the side of the first substrate, optical leak current can be prevented in the TFT, and the display contrast can be improved.

Furthermore, in the above embodiment, the TFT of the driver section is the same top gate type as the TFT of the pixel section, the active layer of the driver section TFT is made of the same material as the active layer of the pixel section TFT, and the conductive layer made of the same material as the second electrode is formed on the lower layer (on the substrate side) which is a part of at least the active layer in the same way as the pixel section TFT, so that when the active layers of the pixel section TFT and the driver section TFT are formed, they can be formed under the same conditions. Therefore, TFTs formed on the same substrate can be formed to have the same properties.

[Embodiment 2]

Figure 12:
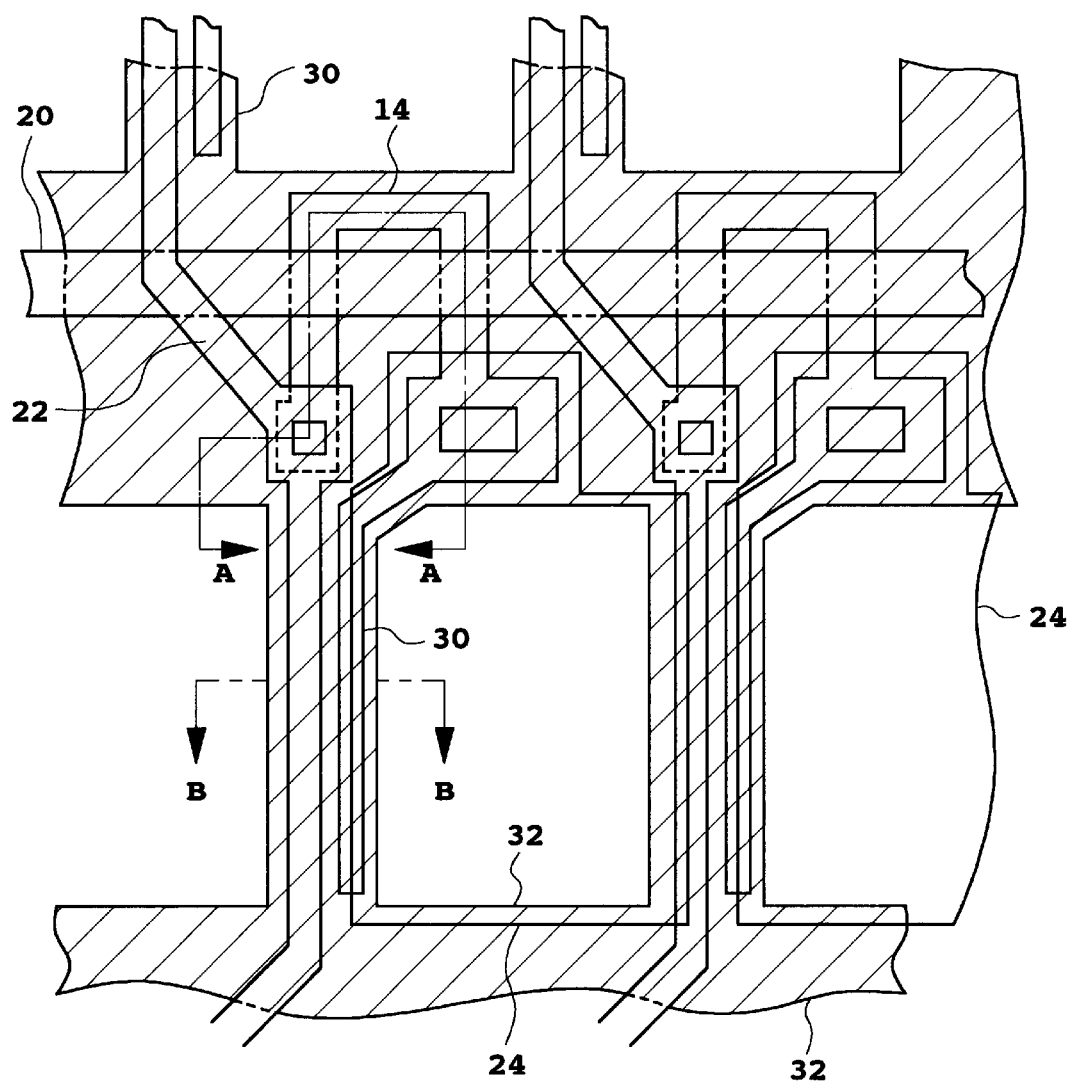
FIG. 12 is a a schematic diagram showing the structure of a display pixel of the active matrix LCD according to a second embodiment of the present invention.
Figure 13:
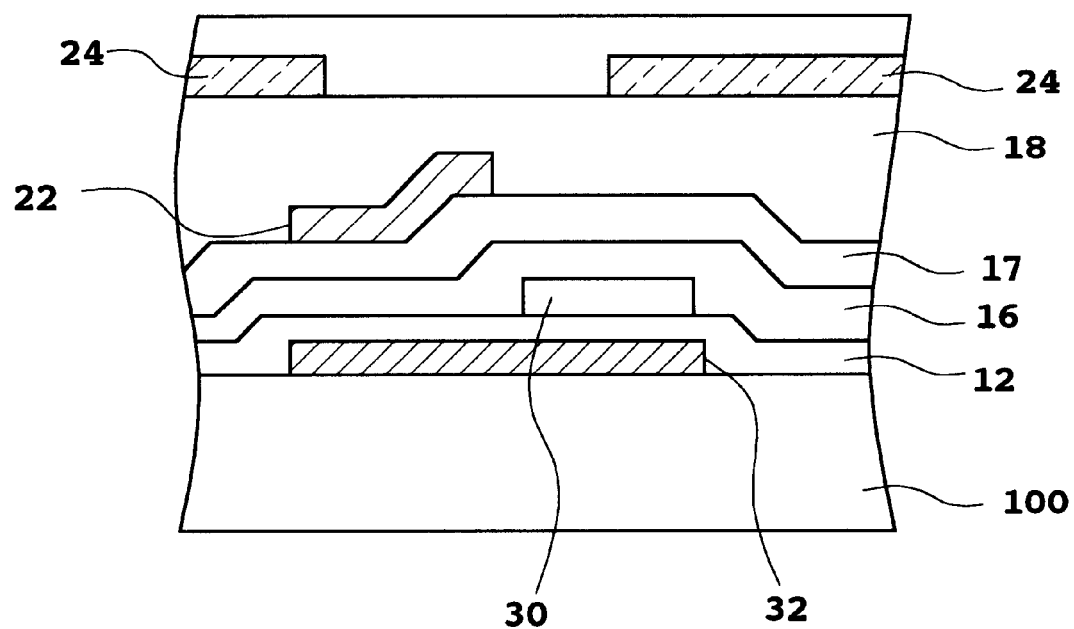
FIG. 13 is a schematic sectional diagram showing the structure on the side of the first substrate of the LCD taken along line B—B of FIG. 12.

FIG. 12 shows a plan structure of the display pixel of the active matrix LCD according to a second embodiment of the present invention. The structure of the LCD along line A—A of FIG. 12 is the same as in the aforementioned FIG. 5, and FIG. 13 shows a structure of the first substrate along line B—B of FIG. 12. The same reference numerals are used to denote components corresponding to those already described, and their description will not be repeated.

The storage capacitor Csc is configured in a region where the first electrode 30 and the second electrode 32 are overlapped with the insulating layer 12 held between them, in the same way as in the first embodiment. However, the second embodiment differs from the first embodiment in that the first electrode 30 is integrally formed with the active layer 14 of the TFT1, and this first electrode 30 is formed of a protruded section which is drawn out from the active layer 14 along the data line 22 running beside the pixel. The second electrode 32 is formed on the first substrate 100, the insulating layer (buffer layer) 12 is formed thereon, and the first electrode 30 is formed on the insulating film 12. Thus, the storage capacitor Csc is configured of the first and second electrodes 30, 32 which are opposed to each other with the insulating film 12 held between them, a voltage corresponding to the displayed content supplied from the data line 22 through the TFT 1 is applied to the first electrode 30, and the storage capacitor voltage Vsc common in, for example, the display region is applied to the second electrode 32.

In the second embodiment, the first electrode 30 of the storage capacitor Csc is configured with the active layer 14 extended along the data line 22, and, more specifically, is arranged so as not to overlap the data line 22 as shown in FIG. 12 and FIG. 13. The data line 22 and the first electrode 30 are insulated in the direction of a film thickness by the gate insulating film 16 and the interlayer insulating film 17 as described later, but when the data line 22 to which a high voltage corresponding to the displayed content is applied and the first electrode 30 are overlapped with the insulating layer between them, coupling is caused, and electrical charge held by the storage capacitor Csc is affected by a voltage of the data line 22. By employing a configuration wherein the first electrode 30 does not overlap the data line 22 as in the second embodiment, the storage capacitor Csc is formed between the first electrode 30 and the second electrode 32 located below, and coupling is prevented.

The material for the second electrode 32 of the storage capacitor Csc is not limited to the material of the gate because the second electrode 32 is not required to be the same layer as the gate line, which differs from the second electrode of the conventional storage capacitor. Therefore, the material of the second electrode 32 is not limited to a metallic material, which generally shields light if it is a conductive material, and a transparent conductive material such as an ITO can be used.

In the second embodiment, however, the second electrode 32 is not formed of a transparent conductive material but formed of a light-shielding metallic material in the same way as in the aforementioned embodiment. This light-shielding second electrode 32 extends not only to the lower layer region of the first electrode 30 but also to the lower layer region of at least the channel region 14c of the active layer 14 of the top gate type TFT 1 to shield the channel region 14c from light. In the layout shown in FIG. 12, the active layer 14 of the TFT 1 is extended from the vicinity of the lower layer of the data line 22 and routed below the gate line 20 (two times in FIG. 12), and the channel region 14c is formed in the intersection region with the gate line 20 of the active layer 14. Therefore, in order to make the second electrode 32 of the storage capacitor Csc function as the light-shielding layer of at least the channel region 14c as in the first embodiment, the second electrode 32 must be formed in a location overlapping a gate (gate line). Considering clearance of alignment, the second electrode 32 is preferably formed to have a width slightly larger (e.g., 2 μm each) than that of at least the gate line below the gate line 20. Thus, the second electrode 32, which is light shielding, is arranged to overlap the channel region in the second embodiment 2 to prevent the incident light from the side of the first substrate from reaching the channel region 14c of the TFT 1. Therefore, production of an optical leak current resulting from light entering from the side of the first substrate is suppressed, and the display contrast is further improved.

When the second electrode 32 is also used to shield the active layer from light, the electrode maybe extended to the lower layer region of the active layer in addition to the lower layer of the first electrode 30. However, in the second embodiment, the second electrode 32 is patterned to have an open region corresponding to the pixel electrode in the display region (see FIG. 12) and to cover the other region in the same way as in the previous embodiment. When the light-shielding material is used for the second electrode 32 and formed to have the matrix pattern shown in FIG. 1, the overlapping area of the second electrode 32 and the first electrode 30, which is integral with the active layer 14, can be increased, and the active layer 14 can be more securely shielded from light. Furthermore, a second electrode 32 patterned as described above can also be used as the black matrix of the panel. Therefore, when the outside (the lower side in FIG. 5) of the first substrate is determined as an observation surface of the display device according to the second embodiment, such as in the lamp of a projector, the first substrate can be disposed on the side of a light source, and the irradiation of light to the active layer 14 can be prevented to further improve the contrast.

As the active layer 14 of the TFT 1, the same p-Si layer can be used as in the first embodiment. In the first embodiment, the second electrode 32 of the storage capacitor Csc is formed below the p-Si layer, so that the polycrystalline grain size can be made uniform, and the TFT with less variation in properties can be formed.

The respective components on the side of the first substrate of the LCD according to the second embodiment can be produced by the production method described above for the previous embodiment with the exception that the pattern such as a layout of the active layer, the first electrode 30 which is integral with it, and the data line 22 will be somewhat different, as shown in FIG. 12.

In this embodiment, the first electrode 30 in which an impurity is doped in a high concentration is produced in the region extended from the source region 14s to the data line 22 at the same time when the drain and source regions 14d, 14s are formed.

The TFT which has the polycrystalline silicon layer as the active layer is formed on the outside (the periphery of the substrate) of the display region of the first substrate 100 by substantially the same process as that used for the TFT 1 of the pixel section described above, and a built-in drive circuit (gate driver, data driver) may be formed.

As described above, according to the second embodiment, the first electrode of the storage capacitor in each pixel of the active matrix display device is extended from the active layer of the top gate type TFT along the data line, without overlapping the data line. Also, the second electrode of the storage capacitor is formed below the TFT active layer with the insulating film between these layers. Configuring the device in this way facilitates improvements in the aperture ratio and the storage capacitor value.

[Embodiment 3]

Figure 14:
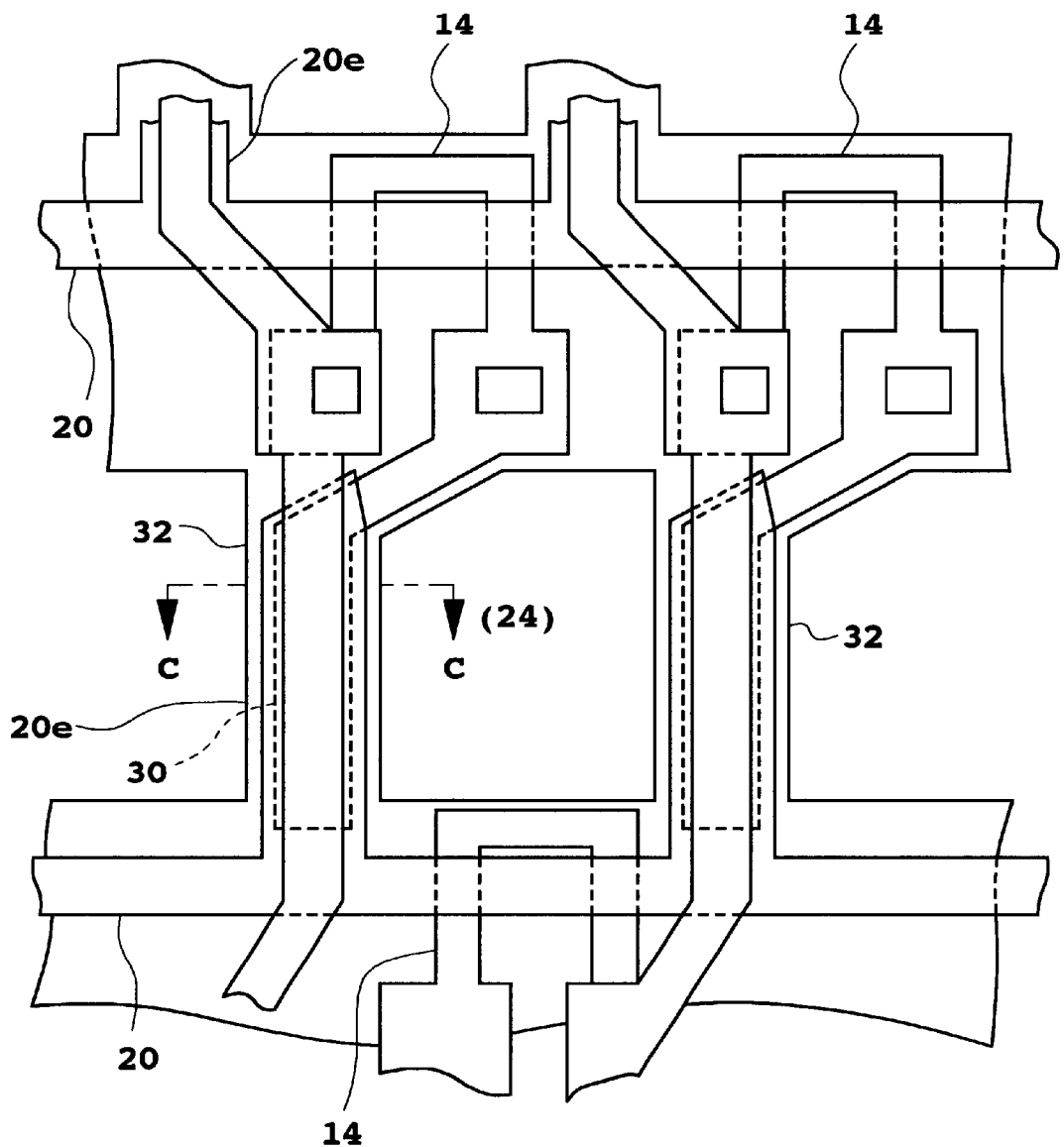
FIG. 14 is a schematic diagram showing the structure of a display pixel of an active matrix LCD according to a third embodiment of the present invention.
Figure 15:
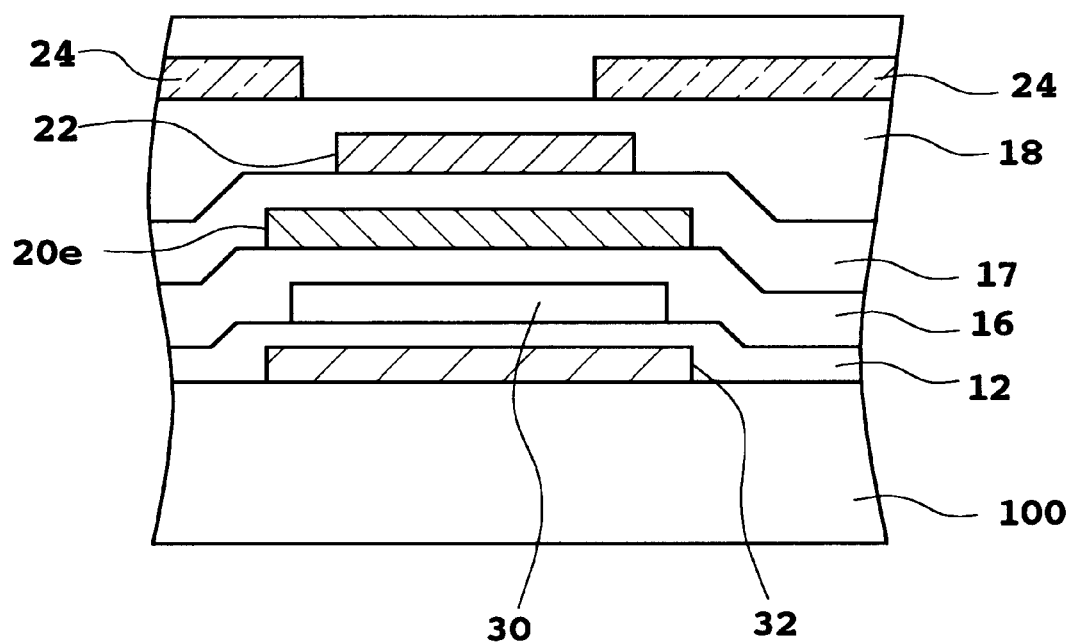
FIG. 15 is a schematic sectional diagram showing the structure of the LCD according to the third embodiment along line C—C of FIG. 14.

FIG. 14 shows a schematic plan structure of the display pixels of the active matrix liquid crystal display device according to a third embodiment of the present invention. It is to be understood that the pixel electrode 24 is simplified to provide an easier-to-understand drawing. FIG. 15 shows the structure of the first substrate along line C—C of FIG. 14. The same reference numerals are used for e components which are common to those of the first and second embodiments described above.

In the second embodiment, in order to prevent coupling, the first electrode 30 of the storage capacitor, which is integral with the TFT active layer, is arranged so as not to overlap the data line 22. According to the third embodiment, on the other hand, the first electrode 30 of the storage capacitor overlaps the data line forming region. Therefore, in order to prevent coupling, a conductive shielding layer is formed between the layers in the superimposed region of the first electrode 30 and the data line. This conductive shielding layer may be any layer to which a prescribed voltage is applied.

In the second embodiment, the gate line 20 which selects the TFT of the next line also serves as the conductive shielding layer 20e as shown in FIG. 14. Specifically, a protruded section is formed in the direction of the previous stage along the data line 22 at a position of the data line 22 which intersects the respective gate lines 20, and the protruded section configures the conductive shielding layer 20e. In the third embodiment, the TFT is the same top gate type as in the first embodiment, and the first electrode 30 of the storage capacitor Csc is integral with the p-Si active layer 14. Therefore, the structure of the region where the storage capacitor Csc is formed is as shown in FIG. 15. Specifically, the second electrode 32 is formed on the first substrate 100 in the same manner as in the first embodiment, the insulating film 12 is formed to cover the second electrode 32, and the first electrode 30 is formed on the insulating film 12 to extend from the active layer 14 to the data line forming region. The first electrode 30 is covered with the gate insulating film 16, the shielding layer 20e extended from the gate line 20 of the next stage is formed on the gate insulating film 16, the interlayer insulating film 17 is formed on the shielding layer 20e, and the data line 22 is formed on the insulating film 17.

As described above, according to the third embodiment, the shielding layer 20e is formed between the data line 22 and the first electrode 30 of the storage capacitor Csc to prevent the data line and the first electrode 30 from coupling. Furthermore, it is possible that the storage capacitor be configured not only in the superimposed region of the first and second electrodes 30, 32 of the storage capacitor Csc, but also between the first electrode 30 of the storage capacitor Csc and the shielding layer 20e so as to enable formation of a large capacitor without lowering the aperture ratio.

Here, it is preferable that as the second electrode 32 of the storage capacitor Csc, a light-shielding material having a high melting point, such as Cr, can be used in the same manner as in the first and second embodiments, and the second electrode 32 is overlapped with at least the channel region of the active layer 14 of the TFT such that the second electrode 32 shields the TFT from light incident from the side of the first substrate. Especially, when the second pixel electrode 32 has a pattern covering a region excluding the pixel open region as shown in FIG. 14, the area overlapping the first electrode 30 increases, and the storage capacitor Csc is increased. Meanwhile, the light-shielding effect of the TFT is also improved. Thus, a further contribution is made towards improvement of display quality.

According to the third embodiment, the first electrode is extended to the data line forming region to configure there the storage capacitor between the first electrode and the second electrode located below it and also to dispose the conductive shield extended from the gate line or the like of the next stage between the data line and the first electrode. As a result, coupling between the data line and the first electrode of the storage capacitor can be prevented, and a large storage capacitor can be efficiently disposed for each pixel. Therefore, a display device having high contrast and high display quality can be realized.

Furthermore, because a light-shielding material is used for the second electrode and is disposed not only to overlap the first electrode, but is also formed to cover at least the active layer region of the TFT, the TFT can be shielded from incident light from the side of the first substrate, and optical leak currents can be reliably prevented.

[Embodiment 4]

Figure 16:
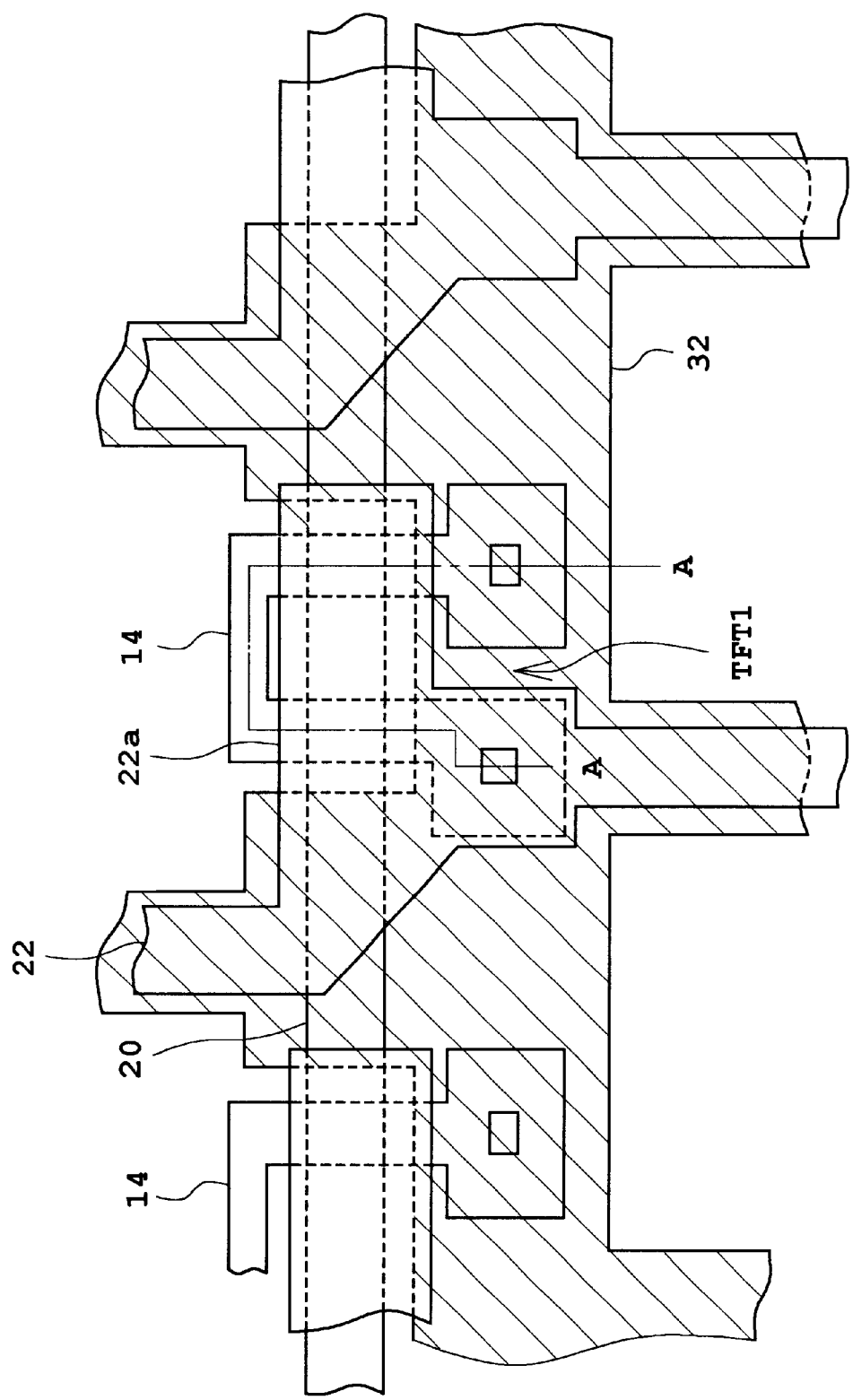
FIG. 16 is a schematic diagram showing the structure of a display pixel of an active matrix LCD according to a fourth embodiment of the present invention.
Figure 17:
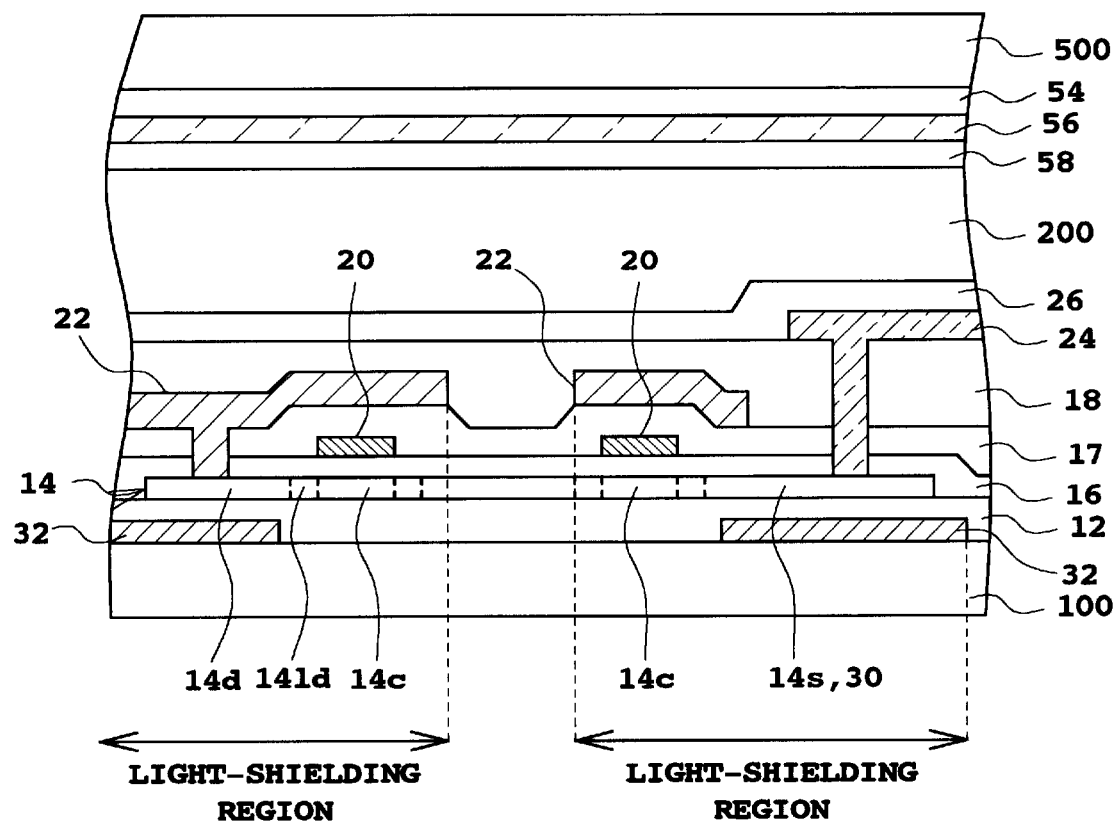
FIG. 17 is a schematic sectional diagram showing the structure of the LCD according to the fourth embodiment along line A—A of FIG. 16.

FIG. 16 shows the structure of a display section of an active matrix LCD according to a fourth embodiment of the present invention. In the drawing, for ease of explanation, the pixel electrode is not shown. FIG. 17 shows the structure of the LCD along line A—A of FIG. 16.

Unlike in the earlier embodiments, in the configuration of the fourth embodiment, the second electrode 32 configuring the storage capacitor Csc in cooperation with the first electrode 30, respective regions for forming the TFT 1, specifically, at least the channel region 14c of the active layer 14, are open. Still more specifically, the periphery of the channel region and the pixel display region of the second electrode 32 are open; the second electrode 32 shields the region along the data line 22 and the gate line 20 from light, and overlaps the first electrode 30 of the storage capacitor Csc to configure the storage capacitor Csc. The second electrode 32 shields a region, which is wider than the data line and the gate line by a prescribed width at the position along the data line and the gate line, from light considering a clearance of alignment. Because the second electrode 32 is not required to be formed on the same layer as the gate line, as is the second electrode of a conventional storage capacitor, the material for forming the electrode is not limited to the gate material, but may be a metallic material having a high melting point, such as Cr, Mo or the like. Such a light-shielding conductive material can function as the black matrix and can tolerate the processes performed after the formation of the second electrode 32. The configuration of the fourth embodiment differs from that of the above embodiments in that the second electrode 32 of the storage capacitor Csc can also serve as the black matrix which shields the non-display region between the pixels while the pixel display region is open.

Thus, the second electrode 32 of the storage capacitor Csc which is disposed below the active layer 14 and also serves as the black matrix is open in at least the channel region 14c, which in turn contributes towards preventing variation of the properties of the TFT 1. As described above, a polysilicon (p-Si) layer which is polycrystallized by laser annealing or the like can be used for the active layer 14 of the TFT 1, and, when amorphous silicon is polycrystallized by laser annealing, the annealing conditions vary when there is a difference in thermal conductivity below the amorphous silicon film. Such variation in the annealing conditions causes variations in the grain size in the active layer 14. Such variations, particularly variations in the grain size within the channel region, greatly affect the TFT properties. The second electrode 32 has a higher thermal conductivity than the relatively low melting point glass of which the first substrate is made. Therefore, when the p-Si active layer 14 is formed by laser annealing, the presence or the absence of the second electrode 32 having high thermal conductivity below the active layer 14 is not desirable because it will lead to variations in the annealing conditions. However, in the channel region of the active layer 14 according to the fourth embodiment, because the second electrode 32 is not formed in the region immediately below the channel region, the disposition on the substrate of the second electrode 32 of each TFT does not affect the annealing conditions.

In an active matrix LCD which uses the polysilicon layer for the TFT active layer, the TFT of the driver section which uses the same polysilicon layer as the active layer on the periphery of the pixel section can be built in, as shown in FIG. 7. The polysilicon TFT of the driver section is different from that of the pixel section and does not require a storage capacitor Csc. Also, the conductive layer, such as the second electrode 32, is not formed below the active layer of the top gate TFT of the driver section. Therefore, when the driver TFT not using the storage capacitor Csc is built into the same substrate as the TFT of the pixel section having the storage capacitor Csc and the channel region of the pixel section TFT of the second electrode 32 is open as in the fourth embodiment, the thermal conductivity below the channel region, namely the annealing conditions, can be made equal between the built-in driver TFT and the pixel section TFT. For respective of multiple TFTs which are formed in the pixel section, the annealing conditions can be made the same. Therefore, it becomes possible to form TFTs having the same properties.

In the fourth embodiment of the present invention, the second electrode 32 of the storage capacitor Csc is not limited to one which also serves as a black matrix. For example, a black matrix may be separately disposed, or the black matrix may be omitted from the panel. In such a case, the second electrode 32 is an electrode which configures the storage capacitor Csc in cooperation with the first electrode 30, and the conductive layer has each pixel display region and the periphery of the channel region only opened and has a pattern expanded to the other region of the pixel section. By virtue of this pattern, it is possible to overlap the forming region of the TFT active layer 14 configuring the first electrode 30 while avoiding the channel region and to thus configure a storage capacitor Csc with very high area efficiency. Furthermore, because the channel region 14c of the second electrode 32 is open, in the above active matrix display device having the driver built in, the channel region of the active layer of the driver section TFT not requiring the capacitor electrode in the lower layer and the channel region of the active layer of the pixel section TFT can be annealed for polycrystallization under equal annealing conditions.

Furthermore, according to the fourth embodiment, the light-shielding data line 22 has a region (extended section) 22a which protrudes into the active region of the TFT having an open second electrode 32. Therefore, the TFT active layer 14 is reliably shielded from light incident from the above (the top in FIG. 17) by the light-shielding gate electrode 20 positioned above the channel region 14c and by the extended portion 22s of the data line 22. Thus, occurrence of an optical leak current in the TFT resulting from irradiation of outside light is prevented. Here, because the TFT channel region 14c is shielded from light incident from the upper portion by the gate electrode 20, it is not necessary to form the extended section 22a on the data line 22 to prevent leakage of light from the side of the gate. Rather, as shown in FIG. 16, the open portion of the second electrode 32, which is the black matrix, is completely covered with the data line 22 in the TFT forming region to securely protect it from light. Specifically, when incident light from a source on the side of the first substrate or incident light from the side of the second substrate is reflected by the second electrode, light reflected from the side of the second electrode 32 to the aperture of the channel region is prevented from passing to the side of the liquid crystal 200. Therefore, contrast can be improved. Although the channel region of the TFT may also be shielded from light by a layer other than the data line 22, it is preferable to use the data line 22 as the light-shielding layer because it is thereby not necessary to form a separate light-shielding layer.

The method of producing the elements on the side of the first substrate of the LCD according to this embodiment is the same as in the above embodiment.

In the respective embodiments described above, an LCD was described as an example of the active matrix display device. However, the present invention is not limited to such use and can also be applied to any other active matrix display device employing a storage capacitor for each pixel. For example, the present invention may be applied to an active matrix type electroluminescence display device which has an EL element as the display element, and the same effect can be obtained.

As described above, the display elements such as the top gate type TFT, the storage capacitor, and the liquid crystal are disposed for each pixel of the active matrix display device in the fourth embodiment, and the second electrode of the storage capacitor can function as the black matrix below the active layer of the TFT. The second electrode is open in the channel region of the active layer. Therefore, the storage capacitor can be formed in each pixel without lowering the aperture ratio, and the formation of the second electrode below the active layer does not affect on the formation conditions of the respective TFT channel regions. Therefore, the active layer of each TFT can be formed without variations, and, when the driver built-in type active matrix display device is formed, the active layer of the driver section TFT and the active layer of the pixel section TFT can be formed under the same conditions.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An active matrix display device having a thin-film transistor and a storage capacitor for respective pixels, wherein:

the thin-film transistor is formed on a substrate as a top gate type transistor for each of the respective pixels;

a first electrode of the storage capacitor is electrically connected to an active layer of the thin-film transistor; and a second electrode of the storage capacitor is formed to partly overlap at least the active layer of the thin-film transistor with an insulating layer held between the active layer and the substrate.

2. The active matrix display device according to claim 1, wherein the second electrode of the storage capacitor is provided with a light-shielding function.

3. The active matrix display device according to claim 1, wherein the second electrode of the storage capacitor is formed in a region excluding a pixel aperture region and also serves as a black matrix.

4. The active matrix display device according to claim 1, wherein a polysilicon layer which is polycrystallized by laser irradiation to a formed amorphous silicon layer is used for the active layer of the thin-film transistor.

5. An active matrix display device which has a thin-film transistor, a liquid crystal capacitor and a storage capacitor for respective pixels and in which liquid crystal sealed in a gap between first and second substrates is driven to display data, wherein:

the thin-film transistor is formed on the liquid crystal-opposed side of the first substrate as a top gate type for each of the respective pixels; and the storage capacitor is formed in a region between a first electrode which is also served by an active layer of the thin-film transistor and a second electrode which is disposed with an insulating film held between the active layer of the thin-film transistor and the first substrate.

6. The active matrix display device according to claim 5, wherein the second electrode of the storage capacitor is provided with a light-shielding function.

7. The active matrix display device according to claim 5, wherein the second electrode of the storage capacitor is formed in a region excluding a pixel aperture region and also serves as a black matrix.

8. The active matrix display device according to claim 5, wherein a polysilicon layer which is polycrystallized by laser irradiation to a formed amorphous silicon layer is used for the active layer of the thin-film transistor.

9. An active matrix display device, wherein:

each of pixels disposed in a matrix is configured in the vicinity of an intersection of a gate line and a data line and provided with a thin-film transistor, a display element, and a storage capacitor;

the thin-film transistor is formed on a substrate as a top gate type;

a first electrode of the storage capacitor is configured with an active layer of the thin-film transistor extended along the data line; and a second electrode of the storage capacitor is formed to overlap the first electrode and an insulating layer held between the first electrode and the substrate.

10. The active matrix display device according to claim 9, wherein the second electrode of the storage capacitor is formed of a light-shielding material in a region excluding a pixel aperture region.

11. The active matrix display device according to claim 9, wherein the second electrode of the storage capacitor is formed in a region excluding a pixel aperture region and also serves as a black matrix.

12. The active matrix display device according to claim 9, wherein a polysilicon layer which is polycrystallized by laser irradiation to a formed amorphous silicon layer is used for the active layer of the thin-film transistor.

13. An active matrix display device, wherein:

each of pixels disposed in a matrix is configured in the vicinity of an intersection of a gate line and a data line and provided with a thin-film transistor, a display element, and a storage capacitor;

the thin-film transistor is formed on a substrate as a top gate type;

a first electrode of the storage capacitor is configured with an active layer of the thin-film transistor extended to a region below the data line;

a second electrode of the storage capacitor is formed between the first electrode and the substrate to overlap the first electrode and an insulating layer held between them; and a conductive shielding layer is formed in the region where the data line and the first electrode of the storage capacitor overlap an insulating layer held between the data line and the first electrode.

14. The active matrix display device according to claim 13, wherein the conductive shielding layer is also served by the gate line which supplies the thin-film transistors of the pixels of another row with a selection signal.

15. The active matrix display device according to claim 13, wherein the second electrode of the storage capacitor is formed of a light-shielding material in a region excluding a pixel aperture region.

16. The active matrix display device according to claim 13, wherein the second electrode of the storage capacitor is formed in a region excluding a pixel aperture region and also serves as a black matrix.

17. The active matrix display device according to claim 13, wherein a polysilicon layer which is polycrystallized by laser irradiation to a formed amorphous silicon layer is used for the active layer of the thin-film transistor.

18. An active matrix display device, wherein:

each of pixels disposed in a matrix is configured in the vicinity of an intersection of a gate line and a data line and provided with a thin-film transistor, a display element, and a storage capacitor;

the thin-film transistor is formed on a substrate as a top gate type;

a first electrode of the storage capacitor is formed of a semiconductor layer which configures an active layer of the thin-film transistor;

a second electrode of the storage capacitor is formed between the first electrode and the substrate to overlap the first electrode and an insulating layer held between them; and the second electrode is provided with a black matrix function for shielding light between the respective pixels and has at least a channel region of the thin-film transistor is open.

19. The active matrix display device according to claim 18, wherein a light shielding layer is formed above a non-opposing side of the active layer to the second electrode at least in the channel region of the second electrode which also serves as the black matrix.

20. The active matrix display device according to claim 19, wherein the light-shielding layer is also served by the data line.

21. The active matrix display device according to claim 18, wherein a polysilicon layer which is polycrystallized by laser irradiation to a formed amorphous silicon layer is used for the active layer of the thin-film transistor.

22. An active matrix display device, wherein:
   a pixel section and a driver section are disposed on the same substrate;
   the pixel section is provided with a plurality of pixels arranged in a pattern, and each pixel has a pixel section thin-film transistor, a display element, and a storage capacitor;
   the pixel section thin-film transistor is formed as a top gate type transistor on the substrate of each pixel;
   a first electrode of the storage capacitor is electrically connected to an active layer of the pixel section thin-film transistor;
   a second electrode of the storage capacitor is formed to partly overlap at least the active layer of the pixel section thin-film transistor with an insulating layer held between the active layer and the substrate;
   the driver section has a plurality of driver section thin-film transistors which output a signal for driving the respective pixels of the pixel section;
   the driver section thin-film transistor is configured as a top gate type transistor on the substrate;
   an active layer of the driver section thin-film transistor is configured of the same material layer as the active layer of the pixel section thin-film transistor; and
   a conductive layer which is formed of the same material as the second electrode is disposed between the active layer of the driver section thin-film transistor and the substrate with the insulating layer held between them.

23. The driver built-in type active matrix display device according to claim 22, wherein a polysilicon layer which is polycrystallized by laser irradiation of a formed amorphous silicon layer is used for the pixel section and the active layer of the driver section thin-film transistor.

24. The driver built-in type active matrix display device according to claim 22, wherein the plurality of driver section thin-film transistors have an n-type channel transistor and a p-type channel transistor which are different conduction types, and control a potential of the conductive layer formed between the active layer of the n-type channel transistor and the substrate and a potential of the conductive layer formed between the active layer and the substrate of the p-type channel transistor.

25. A driver built-in type active matrix display device which drives liquid crystal sealed in a gap between first and second substrates to display data, wherein:
   a pixel section and a driver section are disposed on the same substrate;
   the pixel section is provided with a plurality of pixels, each of which has a pixel section thin-film transistor, a liquid crystal capacitor and a storage capacitor;
   the pixel section thin-film transistor is formed as a top gate type transistor for each pixel on the liquid crystal opposing side of the first substrate;
   the storage capacitor is formed in a region formed between a first electrode which is also served by an active layer of the pixel section thin-film transistor, and a second electrode which is disposed to oppose the first electrode with an insulating layer held between them and also disposed between the active layer of the pixel section thin-film transistor and the substrate;
   the driver section comprises a plurality of driver section thin-film transistors which output a signal for driving each pixel of the pixel section; and
   the driver section thin-film transistor is configured as a top gate type transistor on the substrate, an active layer of the driver section thin-film transistor is configured of the same material layer as the active layer of the pixel section thin-film transistor, and a conductive layer which is formed of the same material as the second electrode is disposed between the active layer of the driver section thin-film transistor and the substrate with the insulating layer held between the active layer and the conductive layer.

26. The driver built-in type active matrix display device according to claim 25, wherein a polysilicon layer which is polycrystallized by laser irradiation of a formed amorphous silicon layer is used for the pixel section and the active layer of the driver section thin-film transistor.

27. The driver built-in type active matrix display device according to claim 25, wherein the plurality of driver section thin-film transistors have an n-type channel transistor and a p-type channel transistor which are different conduction types, and control a potential of the conductive layer formed between the active layer and the substrate of the n-type channel transistor and a potential of the conductive layer formed between the active layer and the substrate of the p-type channel transistor.

* * * * *